US009975531B2

(12) United States Patent
Yasui et al.

(10) Patent No.: US 9,975,531 B2
(45) Date of Patent: May 22, 2018

(54) BRAKING CONTROL DEVICE FOR VEHICLE

(71) Applicant: ADVICS CO., LTD., Kariya-shi (JP)

(72) Inventors: Yoshiyuki Yasui, Nagoya (JP); Hiroyuki Kodama, Kariya (JP); Naotoshi Satake, Nagoya (JP)

(73) Assignee: ADVICS CO., LTD., Kariya-Shi, Aichi (JP)

( * ) Notice: Subject to any disclaimer, the term of this patent is extended or adjusted under 35 U.S.C. 154(b) by 0 days. days.

(21) Appl. No.: 15/422,078

(22) Filed: Feb. 1, 2017

(65) Prior Publication Data

US 2017/0144638 A1    May 25, 2017

Related U.S. Application Data

(62) Division of application No. 14/361,760, filed as application No. PCT/JP2012/081118 on Nov. 30, 2012, now Pat. No. 9,604,608.

(30) Foreign Application Priority Data

Nov. 30, 2011    (JP) .................................. 2011-261920
Nov. 30, 2011    (JP) .................................. 2011-261924

(51) Int. Cl.
*B60T 8/17*    (2006.01)
*B60T 8/172*    (2006.01)
(Continued)

(52) U.S. Cl.
CPC ................ *B60T 8/17* (2013.01); *B60T 7/042* (2013.01); *B60T 8/171* (2013.01); *B60T 8/172* (2013.01);
(Continued)

(58) Field of Classification Search
CPC . B60T 8/17; B60T 7/042; B60T 8/171; B60T 8/172; B60T 13/586; H02P 7/28; F16D 61/00
See application file for complete search history.

(56) References Cited

U.S. PATENT DOCUMENTS 5,375,917 A    12/1994 Inagaki et al.
8,000,861 B2 *    8/2011 Yasui ...................... B60T 8/442
                                                                701/48
(Continued)

FOREIGN PATENT DOCUMENTS

DE    10361042 B3    5/2005
JP    6-206531 A    7/1994
(Continued)

OTHER PUBLICATIONS

International Search Report (PCT/ISA/210) dated Feb. 26, 2013, by the Japanese Patent Office as the International Searching Authority for International Application No. PCT/JP2012/081118.
(Continued)

*Primary Examiner* — Redhwan K Mawari
*Assistant Examiner* — Edward Torchinsky
(74) *Attorney, Agent, or Firm* — Buchanan Ingersoll & Rooney PC

(57) ABSTRACT

A vehicle brake control device includes an electric motor controlled based on a target energization amount calculated based on an operation amount (Bpa) of a braking operation member. Based on the operation amount (Bpa), it is determined whether or not an inertia compensation control for compensating for the influence of the inertia of a brake actuator is necessary. When the inertia compensation control is determined to be necessary, an inertia compensation energization amount for compensating for the influence of the inertia of the brake actuator is calculated based on a time-series pattern set in advance based on the maximum (Continued)

response of the brake actuator. Based on the inertia compensation energization amount, the target energization amount is calculated. The vehicle brake control device is thus able to generate a braking torque that appropriately compensates for the influence of the inertia of the entire device including the inertia of the electric motor.

10 Claims, 15 Drawing Sheets

(51) Int. Cl.
  *B60T 8/171* (2006.01)
  *B60T 7/04* (2006.01)
  *B60T 8/173* (2006.01)
  *B60T 13/58* (2006.01)
  *H02P 3/06* (2006.01)

(52) U.S. Cl.
  CPC ............ *B60T 8/173* (2013.01); *B60T 13/586* (2013.01); *H02P 3/06* (2013.01)

(56) References Cited

U.S. PATENT DOCUMENTS

| | | |
|---|---|---|
| 2005/0046270 A1 | 3/2005 | Arakawa et al. |
| 2005/0046368 A1 | 3/2005 | Arakawa et al. |
| 2006/0261764 A1 | 11/2006 | Erben et al. |
| 2009/0200976 A1 | 8/2009 | Watanabe et al. |
| 2011/0278105 A1 | 11/2011 | Maron et al. |
| 2015/0112565 A1* | 4/2015 | Yasui ...................... B60T 8/171 701/70 |
| 2017/0144638 A1* | 5/2017 | Yasui ...................... B60T 8/17 |

FOREIGN PATENT DOCUMENTS

| | | |
|---|---|---|
| JP | 2002-225690 A | 8/2002 |
| JP | 2005-067401 A | 3/2005 |
| JP | 20050046368 A1 | 3/2005 |
| JP | 20060261764 A1 | 11/2006 |
| JP | 20090200976 A1 | 8/2009 |
| JP | 20110278105 A1 | 11/2011 |
| WO | WO 2009/053429 A1 | 4/2009 |

OTHER PUBLICATIONS

Written Opinion (PCT/ISA/237) dated Feb. 26, 2013, by the Japanese Patent Office as the International Searching Authority for International Application No. PCT/JP2012/081118.

The extended European Search Report dated Jul. 21, 2015, by the European Patent Office in corresponding European Patent Application No. 12852714.0-1756. (6 pgs).

* cited by examiner

BRAKING CONTROL DEVICE FOR VEHICLE

This application is a divisional of U.S. application Ser. No. 14/361,760 filed on Dec. 9, 2014, which is a U.S. national stage application based on International Application No. PCT/JP2012/081118 filed on Nov. 30, 2012 and which claims priority to Japanese Application No. 2011-261920 filed on Nov. 30, 2011 and Japanese Application No. 2011-261924 filed on Nov. 30, 2011, the entire content of each of which is incorporated herein by reference.

TECHNICAL FIELD

The present invention relates to a vehicle brake control device.

BACKGROUND ART

Hitherto, there has been known a vehicle brake control device configured to generate a braking torque by an electric motor. In the device of this type, typically, an indication current (target current) is calculated based on an operation amount of a driver-operated braking operation member of the vehicle, and the electric motor is controlled based on the indication current. Then, a braking torque that depends on the operation of the braking operation member is applied to the wheels.

In the device of this type, due to influences of the inertia (inertia moment, inertia mass) of the entire device including the inertia of the electric motor, particularly in a case of abrupt braking (upon rapid increase of braking torque) or the like, a response delay of the braking torque (a delay of rise thereof) may occur in acceleration during which the rotation speed of the electric motor is increased (e.g., when the electric motor is started) and an overshoot of the braking torque may occur in deceleration during which the rotation speed of the electric motor is decreased (e.g., when the electric motor is intended to be stopped). Therefore, particularly, at abrupt braking, it is desired to compensate for the influences of the inertia, that is, to improve responsiveness (rising performance) of the braking torque during acceleration of the electric motor and to suppress the overshoot of the braking torque during deceleration of the electric motor (improve the convergence).

As to how to cope with this problem, for example, Japanese Patent Application Laid-open No. 2002-225690 describes as follows. That is, based on a map in which indication currents and target motor rotation angles are co-related, a target motor rotation angle corresponding to the calculated indication current is determined, and a target motor rotation angular acceleration is calculated by subjecting the target motor rotation angle to the second-order differentiation. Based on the target motor rotation angular acceleration, an inertia compensation current for compensating for the influences of the inertia of the entire device is calculated. In this case, the inertia compensation current is calculated to be a positive value during acceleration of the electric motor, while the inertia compensation current is calculated to be a negative value during deceleration of the electric motor. This inertia compensation current is added to the indication current, to thereby determine a compensated indication current (target current). In this manner, the compensated indication current is calculated to be slightly larger than the indication current when the electric motor is started, thereby being capable of improving the responsiveness of the braking torque. The compensated indication current is calculated to be slightly smaller than the indication current when the electric motor is intended to be stopped, thereby being capable of suppressing the overshoot of the braking torque.

In addition, Japanese Patent Application Laid-open No. 2002-225690 also describes providing a "gradient limitation" against the indication current for performing stable control when the indication current exceeds the capacity of the electric motor.

SUMMARY

By the way, as described in the above literature, in the case where the inertia compensation current is calculated based on the target motor rotation angular acceleration calculated based on the indication current, if the gradient limitation is provided against the indication current, the target motor rotation angular acceleration cannot be correctly calculated, which is obtained by subjecting the target motor rotation angle obtained based on the indication current to the second-order differentiation. For example, if the indication current is limited to a predetermined gradient limit value, the target motor rotation angular acceleration that corresponds to the second derivative value of the indication current is maintained at "zero (0)". As a result, it may be difficult to provide an appropriate (highly precise) compensation for the above-mentioned influences of the inertia.

A description is now made of this matter with reference to FIG. 15. In the example shown in FIG. 15 in which the electric motor starts up at a time t0, an indication current is limited to a predetermined gradient limit value in a period between "a time point after a short time duration from the time t0" and "a time t1 at which a supposed indication current (see the solid line) and the indication current under the gradient limitation (see the dashed line) intersect". In this case, the rotation speed of the electric motor is increased for the short time duration elapsed from the time t0 (thus, a positive target motor rotation angular acceleration is generated), the rotation speed of the electric motor is decreased for a very short time duration elapsed from the time t1 (thus, a negative target motor rotation angular acceleration is generated), and the rotation speed of the electric motor remains unchanged for other time durations (thus, the target motor rotation angular acceleration is maintained at zero (0)). In other words, as shown in FIG. 15, a positive inertia compensation current is generated for the short time duration elapsed from the time t0, a negative inertia compensation current is generated for the very short time duration elapsed from the time t1, and the inertia compensation current is maintained at zero (0) for the other time durations.

Therefore, improving the responsiveness of the braking torque during acceleration of the electric motor is achieved insufficiently and suppressing the overshoot of the braking torque during deceleration of the electric motor is also achieved insufficiently. This will request a further adequate compensation for the influences of the inertia.

The present invention has been made for coping with the above-mentioned problems, and has an object to provide a vehicle brake control device configured to generate a braking torque by an electric motor and capable of appropriately compensating for influences of an inertia of the entire device including an inertia of the electric motor.

A vehicle brake control device according to one embodiment of the present invention includes: operation amount acquisition means (BPA) for acquiring an operation amount (Bpa) of a driver-operated braking operation member (BP)

of a vehicle; braking means (BRK) for causing an electric motor (MTR) to generate a braking torque to a wheel (WHL) of the vehicle; and control means (CTL) for calculating a target energization amount (Imt) based on the operation amount (Bpa) and controlling the electric motor (MTR) based on the target energization amount (Imt).

One feature of the present invention resides in that the control means (CTL) is configured to: determine, based on the operation amount (Bpa), whether or not inertia compensation control for compensating for an influence of an inertia (inertia moment, inertia mass) of the braking means (BRK) is necessary; calculate, in a case where the inertia compensation control is determined to be necessary (FLj←1 or FLk←1), an inertia compensation energization amount (Ijt, Ikt) for compensating for the influence of the inertia of the braking means (BRK) based on a time-series pattern (CHj, CHk) that is set in advance based on a maximum response (e.g., step response) from the braking means (BRK); and calculate the target energization amount (Imt) based on the inertia compensation energization amount (Ijt, Ikt).

More specifically, the control means (CTL) may be configured to: determine, based on the operation amount (Bpa), whether or not the inertia compensation control is necessary during acceleration of the electric motor in which a rotation speed thereof increases; and use, in a case where the inertia compensation control during the acceleration is determined to be necessary (FLj←1), as the time-series pattern (CHj), a first pattern in which the inertia compensation energization amount (Ijt) increases from zero at an increase gradient and thereafter decreases to zero at a decrease gradient, the increase gradient being set in advance based on an actual position change (e.g., actual rotation angular acceleration) of the electric motor (MTR) that occurs when a step input of the target energization amount (Imt) is performed to the electric motor (MTR), the decrease gradient being set in advance to be more gentle than the increase gradient.

Likewise, the control means (CTL) may be configured to: determine, based on the operation amount (Bpa), whether or not the inertia compensation control is necessary during deceleration of the electric motor in which the rotation speed thereof decreases; and use, in a case where the inertia compensation control during the deceleration is determined to be necessary (FLk←1), as the time-series pattern (CHk), a second pattern in which the inertia compensation energization amount (Ikt) decreases from zero at a decrease gradient and thereafter increases to zero at an increase gradient, the decrease gradient being set in advance based on an actual position change (e.g., actual rotation angular acceleration) of the electric motor (MTR) that occurs when a step input of the target energization amount (Imt) is performed to the electric motor (MTR), the increase gradient being set in advance to be more gentle than the decrease gradient.

In order to ensure the responsiveness of the braking torque during acceleration (particularly, upon start-up) of the electric motor, it is important to improve the initial movement (from the rest state to the start-up state) of the electric motor by compensating for the influences of the static friction of the bearings and the like of the electric motor and also by compensating for the influences of the inertia of the entire device. With the above-mentioned configuration, after determination of necessity for the inertia compensation control during acceleration, it is possible to output an inertia compensation energization amount having the preset first time-series pattern (waveform that changes with time). Therefore, the influences of the inertia of the entire device including the electric motor, and the static friction of, for example, the bearings are compensated, and hence the responsiveness of the braking torque at the initial movement of the electric motor can efficiently be improved.

Likewise, also during deceleration of the electric motor (when the electric motor shifts to its stopped state from the moving state), it is important to compensate for the inertia of the electric motor at an initial stage of the deceleration. With the above-mentioned configuration, after determination of necessity for the inertia compensation control during deceleration, it is possible to output an inertia compensation energization amount having the preset second time-series pattern (waveform that changes with time). Therefore, the deceleration of the electric motor is increased immediately after the electric motor begins to decelerate, and hence the overshoot of the braking torque can efficiently be suppressed. In summary, with the above-mentioned configuration, it is possible to efficiently and properly compensate for the influences of the inertia of the entire device including the inertia of the electric motor.

In the above-mentioned brake control device, it is preferred that the control means (CTL) be configured to maintain the inertia compensation energization amount (Ijt) at zero in a case where the electric motor (MTR) is in motion immediately before the inertia compensation control during acceleration is determined to be necessary (FLj←1). In other words, in a case where the electric motor has already been in rotation at a time when the inertia compensation control during acceleration is determined to be necessary, the inertia compensation control during acceleration is not executed.

In general, the necessity for improving the responsiveness of the braking torque during acceleration of the electric motor is significant when the electric motor is at rest before start of the braking control. With the above-mentioned configuration, the inertia compensation control during acceleration is executed only in a case where the electric motor is at rest when the inertia compensation control during acceleration is determined to be necessary. Therefore, an occurrence of an unnecessary execution of the inertia compensation control during acceleration is suppressed, and hence the control reliability can be improved.

In addition, in the above-mentioned brake control device, it is preferred that the control means (CTL) be configured to calculate the inertia compensation energization amount (Ikt) based on the second pattern (CHk) instead of the first pattern (CHj) in a case where the inertia compensation control during deceleration is determined to be necessary (FLk←1) in a period during which the inertia compensation energization amount (Ijt) is calculated based on the first pattern (CHj).

In this manner, in a case where a driver stops abrupt braking during the execution of the inertia compensation control during acceleration started by the driver's operation for the abrupt braking, the execution of the inertia compensation control during acceleration can be stopped immediately and instead an immediate execution of the inertia compensation control during deceleration can be started. Thus, it is possible to reliably suppress the overshoot of the braking torque.

In addition, in the above-mentioned brake control device, it is preferred that the control means (CTL) be configured to maintain the inertia compensation energization amount (Ikt) at zero in a case where the inertia compensation control during deceleration is determined to be necessary (FLk←1) in a state in which the inertia compensation control during acceleration is not determined to be necessary.

In general, in a case where the inertia compensation control is not necessary upon start-up of the electric motor, the probability of necessity for the inertia compensation control is also low during deceleration. With the above-mentioned configuration, only in a case where the inertia compensation control during acceleration is necessary upon start-up of the electric motor, the inertia compensation control during deceleration is executed. Thus, an occurrence of an unnecessary execution of the inertia compensation control during deceleration is suppressed, and hence the control reliability can be improved.

Another vehicle brake control device according to the present invention includes: operation amount acquisition means (BPA) for acquiring an operation amount (Bpa) of a driver-operated braking operation member (BP) of a vehicle; braking means (BRK) for causing an electric motor (MTR) to generate a braking torque to a wheel (WHL) of the vehicle; and control means (CTL) for calculating a target energization amount (Imt) based on the operation amount (Bpa) and controlling the electric motor (MTR) based on the target energization amount (Imt).

One feature of the present invention resides in that the control means (CTL) is configured to: calculate an inertia compensation energization amount (Ijt, Ikt) for compensating for an influence of an inertia of the braking means (BRK) based on a delay element (DLY) having a time constant (τm) indicating a response from the braking means (BRK) and the operation amount (Bpa); and calculate the target energization amount (Imt) based on the inertia compensation energization amount (Ijt, Ikt).

In order to ensure the responsiveness of the braking torque during acceleration (particularly, upon start-up) of the electric motor, it is important to improve the initial movement (from the rest state to the start-up state) of the electric motor by compensating for the influences of the static friction of the bearings and the like of the electric motor and also by compensating for the influences of the inertia of the entire device. With the above-mentioned configuration, the actual response of the braking means is indicated based on the "delay element using the time constant (a parameter indicating the quickness of the response from the delay element)" instead of the above-mentioned "gradient limitation", and hence the inertia compensation current immediately after the electric motor is brought into acceleration can correctly be calculated (see FIG. 10 to be described later). Therefore, the influences of the inertia of the entire device including the electric motor, and the static friction of, for example, the bearings and the like are compensated, and hence the responsiveness of the braking torque at the initial movement of the electric motor can efficiently be improved.

Likewise, also during deceleration of the electric motor (when the electric motor shifts to its stopped state from the moving state), it is important to compensate for the inertia of the electric motor at an initial stage of the deceleration. With the above-mentioned configuration, the actual response of the braking means is indicated based on the "delay element using the time constant" instead of the above-mentioned "gradient limitation", and hence the inertia compensation current immediately after the electric motor is brought into deceleration can correctly be calculated (see FIG. 10 to be described later). Therefore, the deceleration of the electric motor is increased immediately after the electric motor starts to decelerate, and hence the overshoot of the braking torque can efficiently be suppressed. In summary, with the above-mentioned configuration, it is possible to efficiently and properly compensate for the influences of the inertia of the entire device including the inertia of the electric motor.

In the above-mentioned brake control device, it is preferred that the control means (CTL) be configured to: calculate a processing value (fBp, fFb, fMk) based on the delay element (DLY) and the operation amount (Bpa); calculate an acceleration equivalent value (ddfBp, ddfFb, ddfMk) by subjecting the processing value (fBp, fFb, fMk) to second-order differentiation; and calculate the inertia compensation energization amount (Ijt, Ikt) based on the acceleration equivalent value (ddfBp, ddfFb, ddfMk).

The torque that compensates for the inertia of the entire device (particularly, the inertia of the electric motor) is in proportion to the rotation angular acceleration of the electric motor. In view of this fact, in order to perform the inertia compensation in an adequate manner, it is important to calculate the inertia compensation energization amount based on the rotation angular acceleration of the electric motor (or an equivalent value of the same dimension). The above-mentioned configuration is based on those findings.

In the above-mentioned brake control device, it is preferred to determine the time constant (τm) to have a relatively larger value as the operation amount (Bpa) becomes larger. In this manner, the time constant is set to a small value at a stage in which the operation amount is small, that is, immediately after the electric motor starts to accelerate (upon start-up of the electric motor), and the time constant is set to a large value at a stage in which the operation amount is large, that is, during deceleration of the electric motor. As a result, the responsiveness of the braking torque upon start-up of the electric motor can be ensured, and the acceleration equivalent value that is used for calculating the inertia compensation energization amount can properly be calculated during deceleration of the electric motor.

In the above-mentioned brake control device, it is preferred that the control means (CTL) be configured to: calculate a first kind of the inertia compensation energization amount (Ijt) for increasing the target energization amount (Imt) based on a first time-series pattern (CHj) set in advance in a case where the acceleration equivalent value (ddfBp, ddfFb, ddfMk) exceeds a first predetermined acceleration (ddb1); and calculate a second kind of the inertia compensation energization amount (Ikt) for decreasing the target energization amount (Imt) based on a second time-series pattern (CHk) set in advance in a case where the acceleration equivalent value (ddfBp, ddfFb, ddfMk) is less than a second predetermined acceleration (ddb2).

In order to enhance the effects of the inertia compensation control, it is important to compensate for the initial acceleration in the motion. With the above-mentioned configuration, the proper inertia compensation energization amount can be calculated based on the preset time-series pattern so as to compensate for the inertia at the initial stage of start of the acceleration or deceleration motion of the electric motor. Moreover, the start of the inertia compensation control can be determined based on the acceleration equivalent value. It is to be noted that the time-series pattern whose characteristic depends on the inertia of the electric motor can be found by way of experiments or other means.

It is preferred that the above-mentioned brake control device further include energization amount acquisition means (IMA) for acquiring an actual energization amount (Ima) to the electric motor (MTR), and that the control means (CTL) be configured to: calculate, in a case where the acceleration equivalent value (ddfBp, ddfFb, ddfMk) exceeds a first predetermined acceleration (ddb1), a first kind of the inertia compensation energization amount (Ijt) for increasing the target energization amount (Imt) based on a first time-series pattern (CHj) set in advance, and acquire time-series data (Jdk) that corresponds to the first pattern (CHj) based on the actual energization amount (Ima) acquired in correspondence to the first inertia compensation energization amount (Ijt); and calculate a second kind of the inertia compensation energization amount (Ikt) for decreasing the target energization amount (Imt) based on the time-series data (Jdk) in a case where the acceleration equivalent value (ddfBp, ddfFb, ddfMk) is less than a second predetermined acceleration (ddb2).

Depending on conditions including a power supply voltage, the actual energization amount may be insufficient relative to the target energization amount. With the above-mentioned configuration, based on the actual energization amount during acceleration of the electric motor, the inertia compensation energization amount during deceleration of the electric motor (i.e., target energization amount) is determined. As a result, the proper inertia compensation control suitable for situations including the power supply voltage can be executed.

In the above-mentioned brake control device, it is preferred that the control means (CTL) be configured to: determine, based on the operation amount (Bpa), whether or not the braking operation member (BP) is in an acceleration state in which an operation speed thereof increases; and avoid executing calculation processing that uses the delay element (DLY) in a case where the acceleration state is determined (FLa=1), and execute the calculation processing that uses the delay element (DLY) in a case where the acceleration state is not determined (FLa=0).

In general, calculation processing of a state amount by using the delay element is disadvantageous in view of the responsiveness. With the above-mentioned configuration, when the braking operation is in acceleration (when the operation speed of the braking operation member is being increased), that is, when the responsiveness of the braking torque is in high request, the calculation processing that uses the delay element is inhibited, thereby ensuring the responsiveness of the braking torque.

DETAILED DESCRIPTION OF EMBODIMENTS

Now, a vehicle brake control device according to embodiments of the present invention is described with reference to the drawings.

<Overall Configuration of Vehicle Equipped with Vehicle Brake Control Device of the Present Invention>

Figure 1:
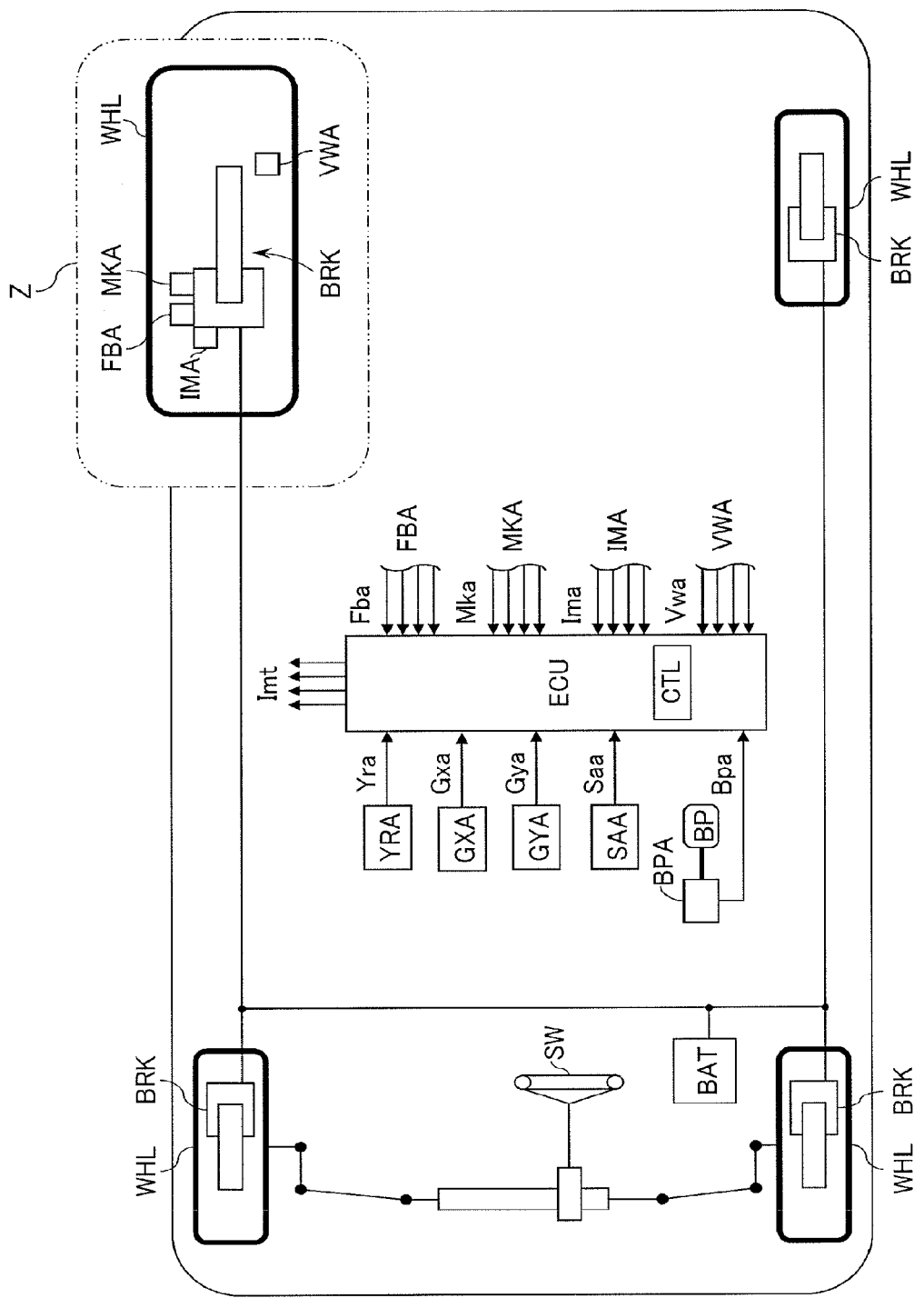
FIG. 1 is a schematic configuration diagram of a vehicle that is equipped with a brake control device according to one embodiment of the present invention.

As illustrated in FIG. 1, this vehicle is equipped with a braking operation member (e.g., brake pedal) BP that is used by a driver for decelerating the vehicle, braking means (brake actuator) BRK by which a braking torque of each wheel is adjusted to generate a braking force therefor, an electronic control unit ECU for controlling the BRK, and a battery BAT as a power source for supplying electric power to the BRK, the ECU, and the like.

In addition, this vehicle includes braking operation amount acquisition means (such as stroke sensor or leg-force sensor) BPA for detecting an operation amount Bpa of the BP, steering angle detection means SAA for detecting a steering angle Saa of a steering wheel SW operated by the driver, yaw rate detection means YRA for detecting a yaw rate Yra of the vehicle, longitudinal acceleration detection means GXA for detecting a vehicle longitudinal acceleration Gxa, lateral acceleration detection means GYA for detecting a vehicle lateral acceleration Gya, and wheel speed detection means VWA for detecting a rotation speed (wheel speed) Vwa of each wheel WHL.

The braking means BRK is equipped with an electric motor MTR (not shown) and the braking torque of the wheel WHL is controlled by the MTR. In addition, the BRK includes pushing force detection means (e.g., axial force sensor) FBA for detecting a pushing force Fba of a friction member to push a rotating member, energization amount detection means (e.g., current sensor) IMA for detecting an energization amount (e.g., current value) Ima to the MTR, and position detection means (e.g., rotation angle sensor) MKA for detecting the position (e.g., rotation angle) Mka of the MTR.

The above-mentioned signals (such as Bpa) that are detected by the various detection means are subject to noise removal (reduction) filter (e.g., low-pass filter) processing and then are supplied to the ECU. In the ECU, arithmetic processing for the brake control related to the present invention is executed. That is to say, control means CTL to be detailed later is programmed in the ECU, and a target energization amount (e.g., target current value or target duty ratio) Imt for controlling the electric motor MTR is calculated based on the Bpa and the like. In addition, based on the Vwa, the Yra, and the like, in the ECU, arithmetic processing is executed for, for example, anti-skid control (ABS), traction control (TCS), and vehicle stabilization control (ESC) that are known.

<Configuration of Braking Means (Brake Actuator) BRK>

In the brake control device according to the present invention, the electric motor MTR generates and adjusts the braking torque of the wheel WHL.

Figure 2:
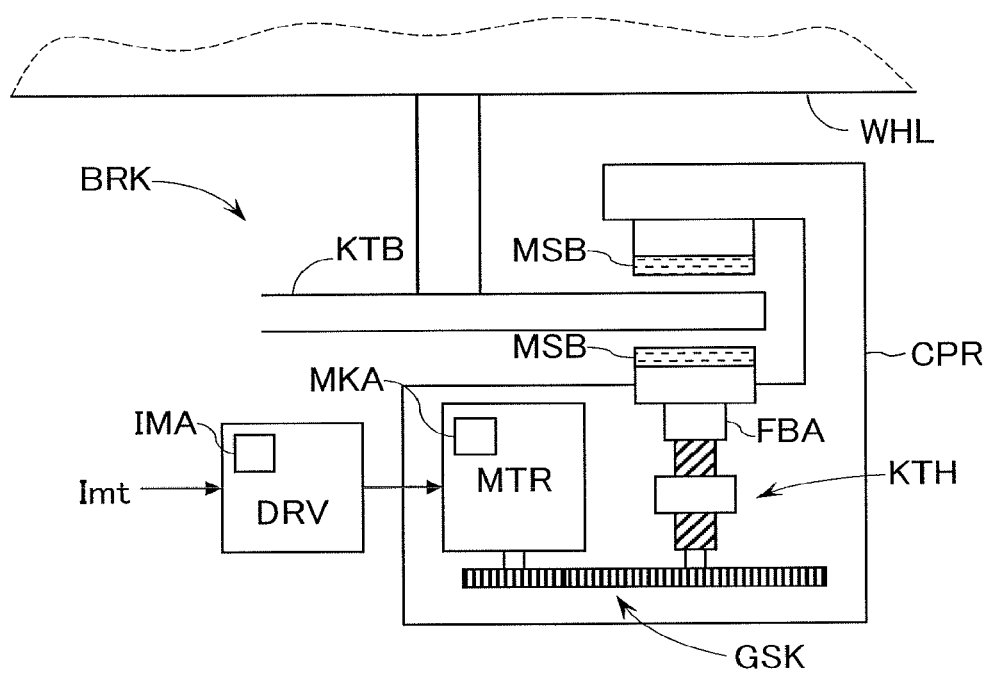
FIG. 2 is a diagram illustrating a configuration of braking means (brake actuator) (Z portion) that is illustrated in FIG. 1.

As illustrated in FIG. 2 that is an enlarged view of the Z portion of FIG. 1, the braking means BRK includes a brake caliper CPR, a rotating member KTB, a friction member MSB, the electric motor MTR, driving means DRV, a reduction mechanism GSK, a rotation/linear motion conversion mechanism KTH, the pushing force acquisition means FBA, the position detection means MKA, and the energization amount acquisition means IMA.

Similarly to the related-art braking device, the brake actuator BRK includes the brake caliper CPR that is known and the friction members (e.g., brake pads) MSB. The MSBs are pushed against the rotating member (e.g., brake rotor) KTB that is known to cause frictional forces, thereby generating a braking torque at the wheel WHL.

In the driving means (driving circuit of the electric motor MTR) DRV, based on the target energization amount (target value) Imt, an energization amount (ultimately, current value) to the electric motor MTR is controlled. In detail, in the driving circuit DRV, a bridge circuit that uses power transistors (e.g., MOS-FETs) is formed, and the power transistors are driven based on the target energization amount Imt to control the output of the electric motor MTR.

The output (output torque) of the electric motor MTR is transmitted, by way of the reduction mechanism (e.g., gear sets) GSK, to the rotation/linear motion conversion mechanism KTH. Then, the KTH converts a rotation motion into a linear motion, and the linear motion urges the friction members (brake pads) MSB onto the rotating member (brake disc) KTB. The KTB is fixed to the wheel WHL, and the friction between the MSB and the KTB generates the braking torque at the wheel WHL in an adjustable fashion. As the rotation/linear motion conversion mechanism KTH, a sliding screw (e.g., trapezoidal screw) that uses "sliding" for power transmission (sliding transmission) or a ball screw that uses "rolling" for power transmission (rolling transmission) is available.

The motor driving circuit DRV includes the energization amount acquisition means (e.g., current sensor) IMA for detecting the actual energization amount (e.g., actual current flowing to the electric motor) Ima. In addition, the electric motor MTR is equipped with the position detection means (e.g., angle sensor) MKA for detecting its position (e.g., rotation angle) Mka. Further, the pushing force acquisition means (e.g., force sensor) Fba is provided for acquiring (detecting) the force (actual pushing force) Fba with which the friction member MSB actually pushes the rotating member KTB.

In FIG. 2, a so-called disc type braking device (disc brake) is illustrated as an exemplary configuration of the braking means BRK, but the braking means BRK may be in the form of a drum type braking device (drum brake). In the case of the drum brake, the friction member MSB is a brake shoe and the rotating member KTB is a brake drum. Similarly, the force with which the brake shoe pushes the brake drum (pushing force) is controlled by the electric motor MTR. As the electric motor MTR, a device that generates a torque by rotation motion is exemplified, but a linear motor is available that generates a force by linear motion.

<Overall Configuration of Control Means CTL>

Figure 3:
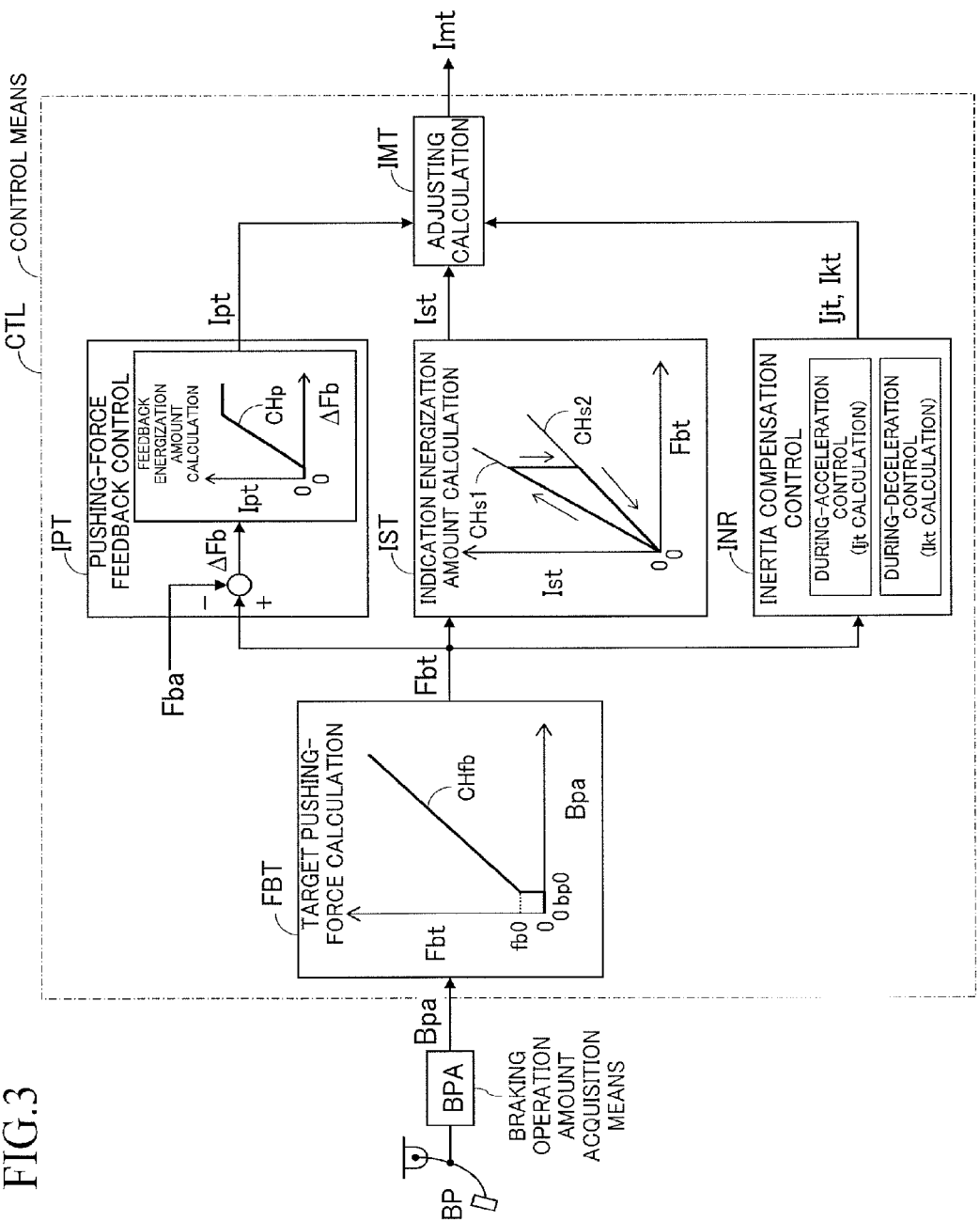
FIG. 3 is a functional block diagram illustrating the braking means (brake controller) that is illustrated in FIG. 1.

As illustrated in FIG. 3, the control means CTL that is illustrated in FIG. 1 includes a target pushing-force calculation block FBT, an indication energization amount calculation block IST, a pushing-force feedback control block IPT, an inertia compensation control block INR, and an energization amount adjusting calculation block IMT. The control means CTL is programmed in the electronic control unit ECU.

An operation amount Bpa of the braking operation member BP (e.g., brake pedal) is acquired by the braking operation amount acquisition means BPA. The operation amount of the braking operation member (braking operation amount) Bpa is calculated based on at least one of an operation force of the braking operation member (e.g., brake pedal force) operated by the driver and a displacement amount (e.g., brake pedal stroke) thereof. The Bpa is subject to calculation processing using a low-pass filter or the like for noise component removal (reduction).

In the target pushing-force calculation block FBT, a predetermined target pushing-force calculation characteristic (calculation map) CHfb is used for calculating a target pushing-force Fbt based on the operation amount Bpa. The "pushing-force" is a force with which the friction member (e.g., brake pad) MSB pushes the rotating member (e.g., brake disc) KTB in the braking means (brake actuator) BRK. The target pushing-force Fbt is a target value of the pushing-force.

The indication energization amount calculation block IST calculates, by using predetermined calculation maps CHs1 and CHs2, an indication energization amount Ist based on the target pushing-force Fbt. The indication energization amount Ist is a target value of the energization amount to the electric motor MTR in order to drive the electric motor MTR of the braking means BRK for achieving the target pushing-force Fbt. Taking into consideration of the hysteresis of the brake actuator, the calculation map (calculation characteristics for indication energization amount) has the two characteristics CHs1 and CHs2. The characteristic (first indication energization amount calculation characteristic) CHs1 is for coping with an increase of the pushing-force, while the characteristic (second indication energization amount calculation characteristic) CHs2 is for coping with a decrease of the pushing-force. For this reason, the characteristic CHs1 is set so as to output a relatively large indication energization amount Ist as compared to the characteristic CHs2.

As used herein, the energization amount is a state amount (variable) for controlling an output torque of the electric motor MTR. Due to the fact that the torque output from the electric motor MTR is almost in proportion to a current supplied thereto, a current target value of the electric motor is available as a target value of the energization amount. In addition, when a voltage supplied to the electric motor MTR is increased, the resultant current is increased, and hence a supply voltage value is available as the target energization amount. Moreover, a duty ratio in pulse width modulation (PWM) makes it possible to adjust the supply voltage value, and hence this duty ratio is available as the energization amount.

In the pushing-force feedback control block IPT, a pushing-force feedback energization amount Ipt is calculated based on the target pushing-force (target value) Fbt and the actual pushing-force (actual value) Fba. The indication energization amount Ist is calculated as a value that corresponds to the target pushing-force Fbt, but an efficiency variation of the brake actuator may cause an error (steady-state error) between the target pushing-force Fbt and the actual pushing-force Fba. The pushing-force feedback energization amount Ipt is calculated and determined to decrease the above-mentioned error (steady-state error) based on a deviation (pushing-force deviation) ΔFb between the target pushing-force Fbt and the actual pushing-force Fba and a calculation characteristic (calculation map) CHp.

In the inertia compensation control block INR, the influence of the inertia (inertia moment in rotation motion or inertia mass in linear motion) of the BRK (particularly, electric motor MTR) is compensated. In the inertia compensation control block INR, target values Ijt and Ikt of the energization amount for compensating for the influence of the inertia (inertia moment or inertia mass) of the BRK are calculated. It is necessary to improve a responsiveness of pushing-force generation in a case where the motion (rotation motion) of the electric motor is brought into acceleration from a state in which the electric motor is at rest or in motion at low speed. In such a case, the corresponding during-acceleration inertia compensation energization amount Ijt is calculated. The Ijt is a target value of the energization amount of the control during acceleration in the inertia compensation control.

In addition, in a case where the electric motor is brought into deceleration to stop from the state in which the electric motor is in motion (rotation motion), it is also necessary to improve the convergence by suppressing the overshoot of the pushing force. To cope with such a case, a during-deceleration inertia compensation energization amount Ikt is calculated. The Ikt is a target value of the energization amount of the control during deceleration in the inertia compensation control. As used herein, the Ijt is a value (a positive value added to the Ist) for increasing the energization amount to the electric motor, while the Ikt is a value (a negative value added to the Ist) for decreasing the energization amount to the electric motor.

Then, in the energization amount adjusting calculation block IMT, the indication energization amount Ist is adjusted by the pushing-force feedback energization amount Ipt and the inertia compensation energization amount Ijt (during acceleration) or the inertia compensation energization amount Ikt (during deceleration), thereby calculating the target energization amount Imt. In detail, the indication energization amount Ist is added with the feedback energization amount Ipt and the inertia compensation energization amount Ijt or Ikt, and the resultant sum is calculated as the target energization amount Imt. The target energization amount Imt is an ultimate target value of the energization amount for controlling the output of the electric motor MTR.

<Configuration of Inertia Compensation Control Block of First Embodiment>

Figure 4:
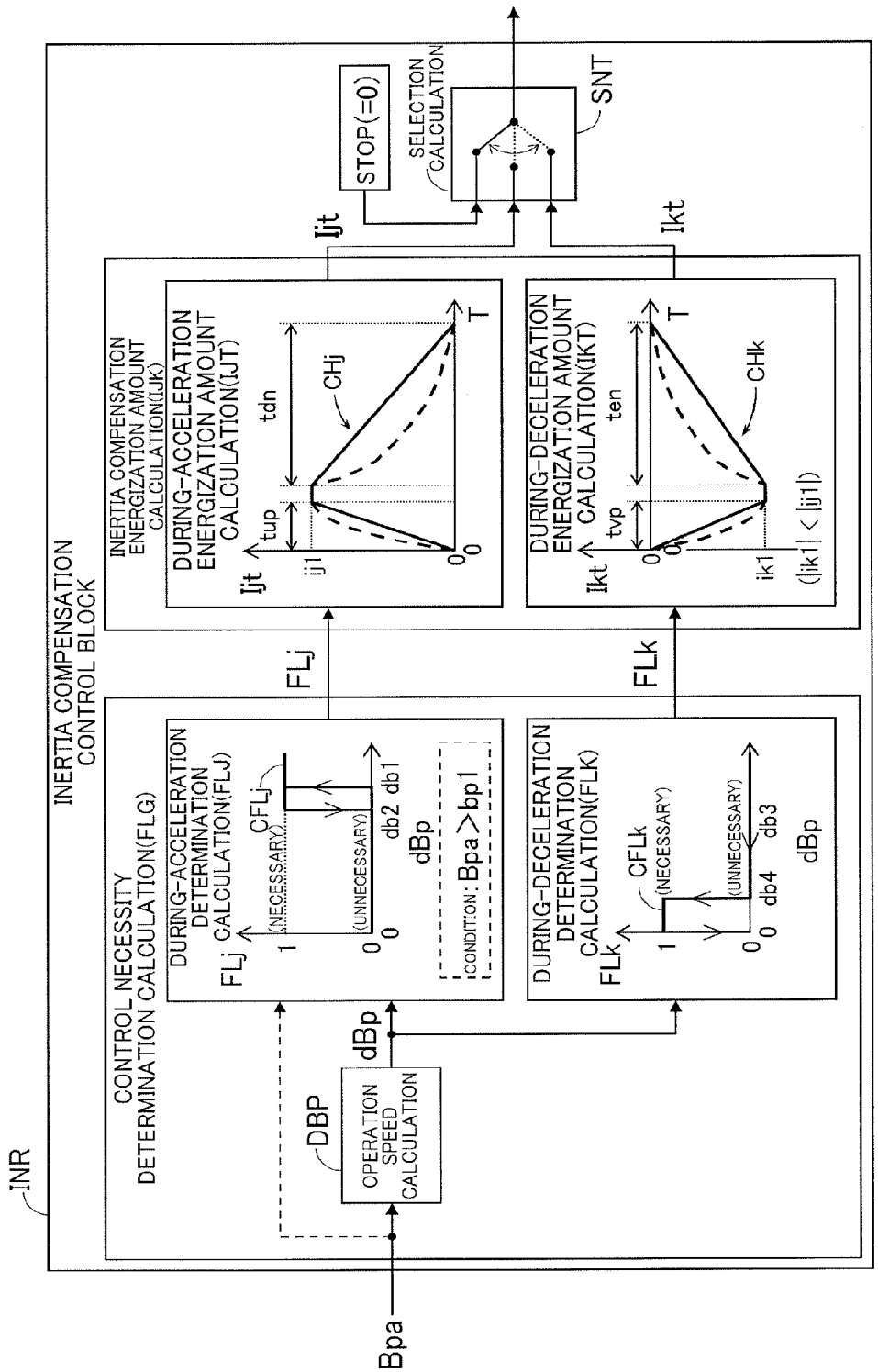
FIG. 4 is a functional block diagram illustrating an inertia compensation control block that is illustrated in FIG. 3 according to a first embodiment of the present invention.

With reference to FIG. 4, the inertia compensation control block INR according to a first embodiment of the present invention is described. As illustrated in FIG. 4, in this inertia compensation control block INR, inertia compensation control is executed for improving the responsiveness of the pushing force which is caused by the inertia of the MTR or the like (the overall inertia of the BRK including the inertia of the MTR) and the convergence. The inertia compensation control block INR includes a control necessity determination calculation block FLG for determining whether or not the inertia compensation control is necessary, an inertia compensation energization amount calculation block IJK for calculating a target energization amount for the inertia compensation control, and a selection calculation block SNT.

In the control necessity determination calculation block FLG, it is determined whether or not executing the inertia compensation control is necessary. The control necessity determination calculation block FLG includes a during-acceleration determination calculation block FLJ for determining the necessity during acceleration of the electric motor (e.g., when the electric motor starts up and increases its speed) and a during-deceleration determination calculation block FLK for determining the necessity during deceleration of the electric motor (e.g., when the electric motor is intended to be stopped). The control necessity determination calculation block FLG outputs, as a determination result, a necessity determination flag FLj (during acceleration) or FLk (during deceleration). "0" of each of the necessity determination flags FLj and FLk represents that the inertia compensation control is unnecessary (unnecessary state), while "1" represents that the inertia compensation control is necessary (necessary state).

The control necessity determination calculation block FLG includes an operation speed calculation block DBP, the during-acceleration determination calculation block FLJ, and the during-deceleration determination calculation block FLK.

At first, in the operation speed calculation block DBP, based on the operation amount Bpa of the braking operation member BP, an operation speed dBp thereof is calculated. The operation speed dBp is calculated by differentiating the Bpa.

In the during-acceleration determination calculation block FLJ, it is determined based on the operation speed dBp which of the "necessary state (state for which executing the control is necessary)" and the "unnecessary state (state for which executing the control is unnecessary)" the inertia compensation control is in during acceleration of the electric motor (e.g., when the rotation speed of the electric motor increases). The result of the determination is output as the necessity determination flag (control flag) FLj. "0" and "1" of the necessity determination flag FLj correspond to the "unnecessary state" and the "necessary state", respectively. Regarding the necessity determination of the during-acceleration inertia compensation control, at a time point when the dBp exceeds a predetermined operation speed (predetermined value) db1, the during-acceleration necessity determination flag FLj is switched from "0 (unnecessary state)" to "1 (necessary state)" (FLj←1) in accordance with the calculation map CFLj. Thereafter, the necessity determination flag FLj is switched from "1" to "0" (FLj←0) at a time point when the dBp is less than a predetermined operation speed (predetermined value) db2. It is to be noted that the FLj is set to be "0" as an initial value in a case where the braking operation is not performed.

Further, in the necessity determination of the during-acceleration inertia compensation control, the operation amount Bpa of the braking operation member is available in addition to the operation speed dBp. In such a case, at a time point when the Bpa exceeds a predetermined operation amount (predetermined value) bp1 and the dBp exceeds the predetermined operation speed (predetermined value) db1, the necessity determination flag FLj is switched from "0" to "1". The use of the condition of Bpa>dp1 as a determination criteria can compensate for the influences of noise and the like in the dBp, thereby enabling a reliable determination.

In the during-deceleration determination calculation block FLK, it is determined based on the dBp which of the "necessary state (state for which executing the control is necessary)" and the "unnecessary state (state for which executing the control is unnecessary)" the inertia compensation control is in during deceleration of the electric motor (e.g., when the rotation speed of the electric motor decreases). The result of the determination is output as the necessity determination flag (control flag) FLk. "0" and "1" of the necessity determination flag FLk correspond to the "unnecessary state" and the "necessary state", respectively. Regarding the necessity determination of the during-deceleration inertia compensation control, at a time point when the dBp that is equal to or more than a predetermined operation speed (predetermined value) db3 is changed to be less than a predetermined operation speed (predetermined value) db4 (<db3), the necessity determination flag FLk is switched from "0 (unnecessary state)" to "1 (necessary state)" (FLk←1) in accordance with the calculation map CFLk. Thereafter, for the prevention of frequent repetition of the during-acceleration control and the during-deceleration control that depends on the dBp, it is possible to set the predetermined operation speed db3 in the during-deceleration control to be less than the predetermined operation speed db1 in the during-acceleration control. It is to be noted that the FLk is set to be "0" as an initial value in a case where the braking operation is not performed.

Information on the necessity determination flags FLj and FLk for the inertia compensation control is fed from the control necessity determination calculation block FLG to the inertia compensation energization amount calculation block IJK.

In the inertia compensation energization amount calculation block IJK, the inertia compensation energization amount (target value) is calculated in a case where the inertia compensation control is determined to be necessary (FLj=1 or FLk=1) in the FLG. The inertia compensation energization amount calculation block IJK includes a during-acceleration energization amount calculation block IJT for calculating the inertia compensation energization amount Ijt during acceleration of the electric motor (e.g., when the electric motor starts up and increases its speed) and a during-deceleration energization amount calculation block IKT for calculating the inertia compensation energization amount Ikt during deceleration of the electric motor (e.g., when the electric motor is intended to be stopped).

In the during-acceleration energization amount calculation block IJT, the during-acceleration inertia compensation energization amount (first inertia compensation energization amount) Ijt is calculated based on the necessity determination flag FLj and the during-acceleration calculation characteristic (calculation map corresponding to the first pattern) CHj. The during-acceleration calculation characteristic CHj is pre-stored in the ECU as the characteristic (calculation map) of the Ijt relative to an elapsed time T since the during-acceleration inertia compensation control is determined to be necessary. The calculation characteristic CHj is set so that the Ijt increases abruptly from "0" to a predetermined energization amount (predetermined value) ij1 along with time from the time T of "0" and thereafter decreases gently from the predetermined energization amount (predetermined value) ij1 to "0" along with time. In detail, in the CHj, a time duration tup that is required for the Ijt to increase from "0" to the predetermined energization amount ij1 is set to be shorter than a time duration tdn that is required for the Ijt to decrease from the predetermined energization amount ij1 to "0".

As illustrated in FIG. 4 with broken lines, in a case where the energization amount increases, it is possible to set the CHj so that the Ijt, which has a "concave-down" characteristic, first increases abruptly and thereafter increases gently. On the other hand, in a case where the energization amount decreases, it is possible to set the CHj so that the Ijt, which has a "concave-up" characteristic, first decreases abruptly and thereafter decreases gently. Then, the time point when the necessity determination flag FLj is switched from "0 (unnecessary state)" to "1 (necessary state)" is defined as an original time point (T=0) of the elapsed time in the CHj, and the inertia compensation energization amount during acceleration of the electric motor (first inertia compensation energization amount) Ijt is determined based on the elapsed time T measured from the switched time point and the during-acceleration calculation characteristic CHj. Even though the necessity determination flag FLj is switched from "1" to "0" in the calculation of the Ijt, the during-acceleration energization amount Ijt keeps being calculated over a continuation duration that is set in advance in the calculation characteristic CHj. It is to be noted that the Ijt is calculated as a positive value and is adjusted to increase the energization amount to the electric motor MTR.

In the during-deceleration energization amount calculation block IKT, the during-deceleration inertia compensation energization amount (second inertia compensation energization amount) Ikt is calculated based on the necessity determination flag FLk and the during-deceleration calculation characteristic (calculation map corresponding to the second pattern) CHk. The during-deceleration calculation characteristic CHk is pre-stored in the ECU as the characteristic (calculation map) of the Ikt relative to an elapsed time T since the during-deceleration inertia compensation control is determined to be necessary. The CHk is set so that the Ikt decreases abruptly from "0" to a predetermined energization amount (predetermined value) ik1 along with time from the time T of "0" and thereafter increases gently from the predetermined energization amount (predetermined value) ik1 to "0" along with time. In detail, in the CHk, a time duration tvp that is required for the Ikt to decrease from "0" to the predetermined energization amount ik1 is set to be shorter than a time duration ten that is required for the Ikt to increase from the predetermined energization amount ik1 to "0".

As illustrated in FIG. 4 with broken lines, in a case where the energization amount decreases, it is possible to set the CHk so that the Ikt, which has a "concave-up" characteristic, first decreases abruptly and thereafter decreases gently. On the other hand, in a case where the energization amount increases, it is possible to set the CHk so that the Ikt, which has a "concave-down" characteristic, first increases abruptly and thereafter increases gently. Then, the time point when the necessity determination flag FLk is switched from "0" to "1" is defined as an original time point (T=0) of the elapsed time in the CHk, and the inertia compensation energization amount during deceleration of the electric motor (second inertia compensation energization amount) Ikt is determined based on the elapsed time T measured from the switched time point and the during-deceleration calculation characteristic CHk. Even though the necessity determination flag FLk is switched from "1" to "0" in the calculation of the Ikt, the Ikt keeps being calculated over a continuation duration that is set in advance in the calculation characteristic CHk. It is to be noted that the Ikt is calculated as a negative value and is adjusted to decrease the energization amount to the electric motor MTR.

Figure 5:
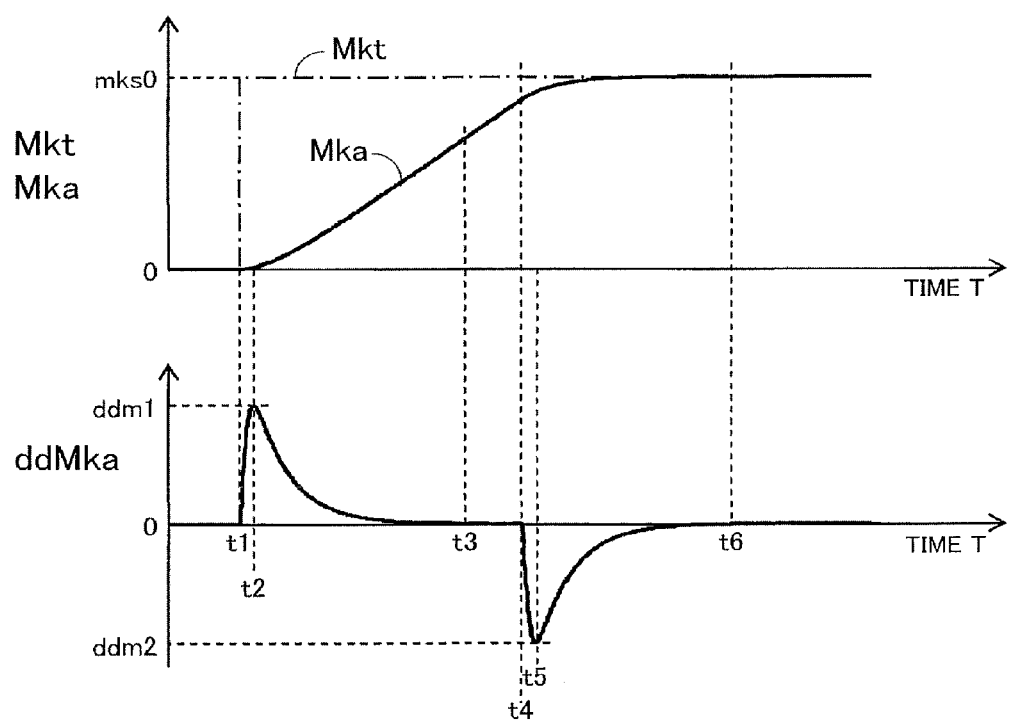
FIG. 5 is a graph showing a maximum response from the braking means (brake actuator).

As used herein, the calculation characteristic CHj (first pattern) in the during-acceleration inertia compensation control and the calculation characteristic CHk (second pattern) in the during-deceleration inertia compensation control are determined based on the maximum response from the braking means (brake actuator) BRK. In response to the changing of the input (target energization amount) to the BRK, the resultant output (displacement of the electric motor) occurs with a delay. The maximum response from the BRK (the maximum achievable state of the BRK in response to the input) means a response from the MTR when providing a step input to the electric motor MTR (how the temporal change amount of the output changes in response to the temporal change amount of the input. In other words, how the actual displacement (rotation angle) Mka of the electric motor MTR changes when the MTR is supplied with a predetermined target energization amount Imt as a step input (in an increasing direction from zero). As shown in FIG. 5, in a case where the electric motor MTR is supplied with the (predetermined) target energization amount as a step input (thus, when the target value Mkt of the rotation angle is provided as a step input (of a predetermined amount mks0)), the actual value (output) Mka of the rotation angle changes to achieve the target value (input) Mkt (to follow the target value with a delay). The CHj and the CHk are determined based on the change of the Mka.

The torque that compensates for the inertia of the entire device (particularly, the inertia of the electric motor) is in proportion to the rotation angular acceleration of the electric motor. In consideration of this fact, for achieving the inertia compensation properly, the inertia compensation energization amount is calculated based on an actual acceleration (rotation angular acceleration) ddMka of the electric motor. For this reason, the acceleration (rotation angular acceleration) ddMka is calculated by subjecting the actual displacement (rotation angle) value Mka of the MTR to the second-order differentiation, and the CHj and CHk are determined based on the resultant ddMka. For example, it is possible to set the first pattern CHj and the second pattern CHk by multiplying the ddMka with a coefficient K (constant).

In the CHj, the increase gradient of the Ijt upon abrupt increase thereof (the gradient of the Ijt relative to time) is determined based on the maximum value or the average value of the increase gradient of the ddMka (the gradient of the ddMka that increases relative to time) between a time t1 when the step input starts and a time t2 when the rotation angular acceleration ddMka reaches its maximum value ddm1. On the other hand, the decrease gradient of the Ijt upon gentle decrease thereof (the gradient of the Ijt relative to time) is determined based on the maximum value or the average value of the decrease gradient of the ddMka (the gradient of the ddMka that decreases relative to time) between the time t2 when the ddMka reaches its maximum value ddm1 and a time t3 when the ddMka reaches almost zero.

In addition, based on the ddMka at the maximum response (step response) (based on the change of ddMka between the times t1 and t2), in a case where the energization amount increases, it is possible to set the CHj so that the Ijt, which has a "concave-down" characteristic, first increases abruptly and thereafter increases gently. Similarly, based on the ddMka at the maximum response (based on the change of ddMka between the times t2 and t3), in a case where the energization amount decreases, it is possible to set the CHj so that the Ijt, which has a "concave-up" characteristic, first decreases abruptly and thereafter decreases gently.

In the CHk, the decrease gradient of the Ikt upon abrupt decrease thereof (the gradient of the Ikt relative to time) is determined based on the minimum value or the average value of the decrease gradient of the ddMka (the gradient of the ddMka that decreases relative to time) between a time t4 when the ddMka begins to decrease from zero and a time t5 when the ddMka reaches its minimum value ddm2. On the other hand, the increase gradient of the Ikt upon gentle increase thereof (the gradient of the Ikt relative to time) is determined based on the maximum value or the average value of the increase gradient of the ddMka (the gradient of the ddMka that increases relative to time) between the time t5 when the ddMka reaches its minimum value ddm2 and a time t6 when the ddMka returns to almost zero.

In addition, based on the ddMka at the maximum response (step response) (based on the change of ddMka between the times t4 and t5), in a case where the energization amount decreases, it is possible to set the CHk so that the Ikt, which has a "concave-up" characteristic, first decreases abruptly and thereafter decreases gently. Similarly, based on the ddMka at the maximum response (based on the change of ddMka between the times t5 and t6), in a case where the energization amount increases, it is possible to set the CHk so that the Ikt, which has a "concave-down" characteristic, first increases abruptly and thereafter increases gently.

In a case where the electric motor MTR is in acceleration (particularly, when the MTR starts up), generating torque is required for overcoming the frictions of the bearings of the MTR, and the like, while in a case where the electric motor MTR is in deceleration (particularly, when the MTR is stopping), the frictions acts on the MTR to be decelerated. For this reason, the absolute value of the during-acceleration predetermined energization amount (the first predetermined energization amount) ij1 is set to be larger than the absolute value of the during-deceleration predetermined energization amount (the second predetermined energization amount) ($|ij1|>|ik1|$).

In the selection calculation block SNT, one of the output of the inertia compensation energization amount Ijt during acceleration of the electric motor, the output of the inertia compensation energization amount Ikt during deceleration of the electric motor, and the output of control stop (output of value "0") is selected and output. In the selection calculation block SNT, in a case where the during-deceleration inertia compensation energization amount Ikt (<0) is output while the during-acceleration inertia compensation energization amount Ijt (>0) is being output, instead of the Ijt, the Ikt is capable of being output with priority. The inertia compensation control is performed based on the time-series waveforms CHj, CHk that are preset by using, as a trigger, the determination of "necessary state" (necessity determination flag). With the above-mentioned configuration, when the driver stops the abrupt braking, the during-acceleration inertia compensation control (calculation of the Ijt) is immediately stopped and is switched to the during-deceleration inertia compensation control (calculation of the Ikt). In this manner, it is possible to positively suppress the overshoot of the pushing-force.

In the control necessity determination calculation block FLg, it is determined whether or not the inertia compensation control is necessary based on the operation speed dBp, but, instead of the operation speed dBp, it is possible to use a target pushing-force speed dFb obtained by differentiating the target pushing-force Fbt. In addition, in a case where the position (e.g., target rotation angle) Mkt of the electric motor is employed as the target value, a target rotation speed dMk obtained by differentiating the target rotation angle Mkt can be used for the necessity determination. In other words, it is possible to determine whether or not the inertia compensation control is necessary based on the value (speed equivalent value) dBp that is equivalent to the operation speed, and is obtained by differentiating the braking operation amount Bpa, the dFb, and the dMk.

<Configuration of Inertia Compensation Control Block of Second Embodiment>

Figure 6:
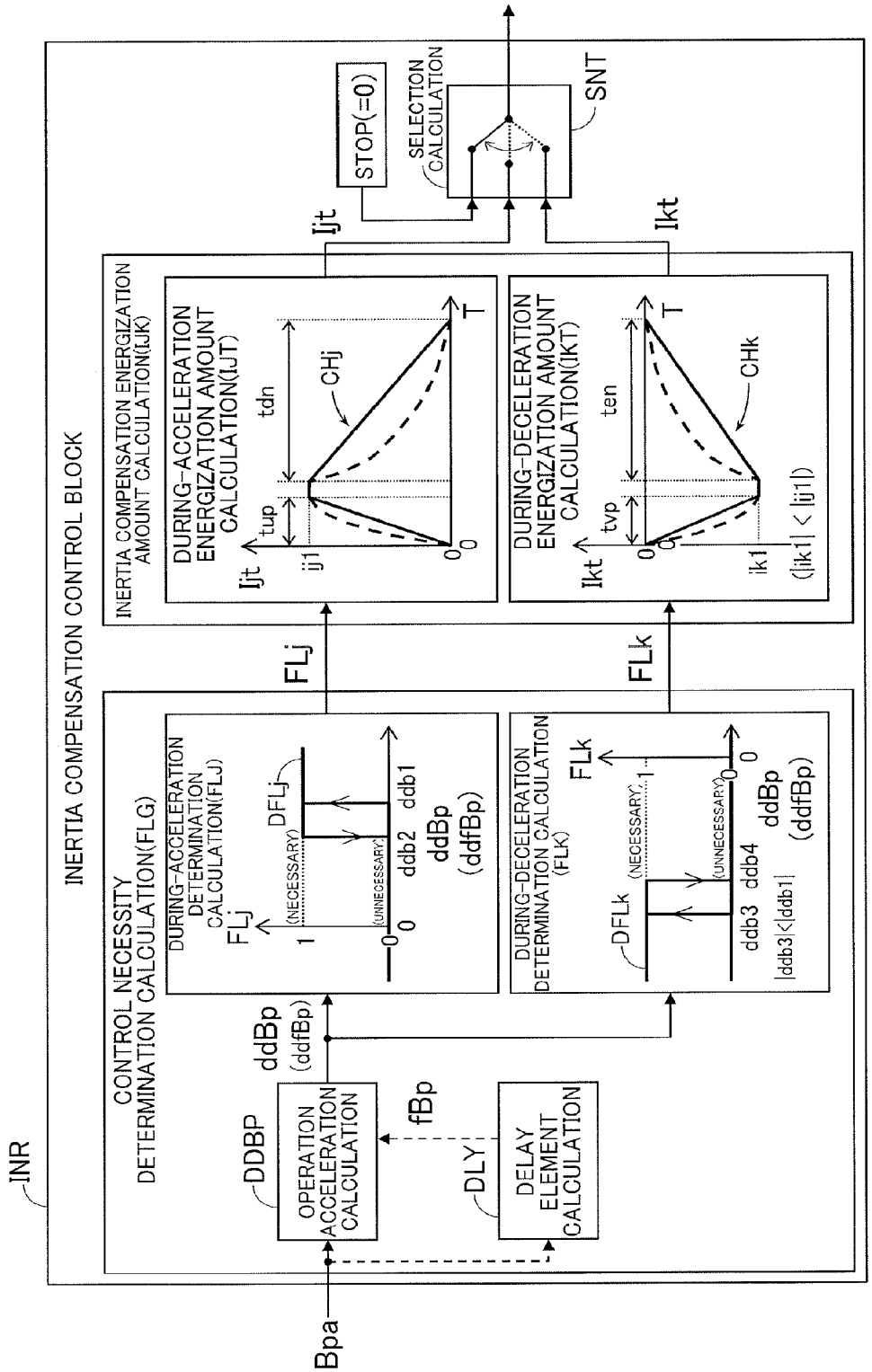
FIG. 6 is a functional block diagram illustrating the inertia compensation control block that is illustrated in FIG. 3 according to a second embodiment of the present invention.

Next, with reference to FIG. 6, the inertia compensation control block INR according to a second embodiment of the present invention is described. As illustrated in FIG. 6, this inertia compensation control block INR includes a control necessity determination calculation block FLG, an inertia compensation energization amount calculation block IJK, and a selection calculation block SNT. The IJK and the SNT are the same as those of the INR in the first embodiment illustrated in FIG. 4, and hence the detailed description thereof is omitted. Hereinafter, only the control necessity determination calculation block FLG is described.

The control necessity determination calculation block FLG includes an operation acceleration calculation block DDBP, a during-acceleration determination calculation block FLJ, and a during-deceleration determination calculation block FLK.

In the operation acceleration calculation block DDBP, based on the operation amount Bpa of the braking operation member, an operation acceleration ddBp thereof is calculated. The operation acceleration ddBp is calculated by finding the second-order differentiation of the Bpa. In other words, the operation amount Bpa is differentiated to calculate the operation speed dBp and then the operation speed dBp is differentiated, to thereby calculate the operation acceleration ddBp.

In the during-acceleration determination calculation block FLJ, it is determined, based on the operation acceleration ddBp, when the inertia compensation control is carried out during acceleration of the electric motor MTR, which of the "necessary state (state for which executing the control is necessary)" and the "unnecessary state (state for which executing the control is unnecessary)." The result of the determination is output as a necessity determination flag (control flag) FLj. "0" and "1" of the necessity determination flag FLj correspond to the "unnecessary state" and the "necessary state," respectively. In accordance with a calculation map DFLj, at a time point when the operation acceleration ddBp exceeds a first predetermined acceleration (predetermined value) ddb1 (>0), the during-acceleration necessity determination flag FLj is switched from "0 (unnecessary state)" to "1 (necessary state)" (FLj←1). Thereafter, the FLj is switched from "1" to "0" (FLj←0) at a time point when the operation acceleration ddBp is less than a predetermined acceleration (predetermined value) ddb2 (<ddb1). It is to be noted that while the FLj is set to be "0" as an initial value in a case where the braking operation is not performed.

In the during-deceleration determination calculation block FLK, it is determined, based on the operation acceleration ddBp, when the inertia compensation control is carried out during deceleration of the electric motor MTR, which of the "necessary state (state for which executing the control is necessary)" and the "unnecessary state (state for which executing the control is unnecessary)." The result of the determination is output as a necessity determination flag (control flag) FLk. "0" and "1" of the necessity determination flag FLk correspond to the "unnecessary state" and the "necessary state," respectively. In accordance with a calculation map DFLk, at a time point when the operation acceleration ddBp is less than a second predetermined acceleration (predetermined value) ddb3 (<0), the during-deceleration necessity determination flag FLk is switched from "0 (unnecessary state)" to "1 (necessary state)" (FLk←1). Thereafter, FLk is switched from "1" to "0" (FLk←0) at a time point when the operation acceleration ddBp is equal to or more than a predetermined acceleration (predetermined value) ddb4 (>ddb3, <0). It is to be noted that the FLk is set to be "0" as an initial value in a case where the braking operation is not performed.

Similarly to the above-mentioned first embodiment (see FIG. 4), the necessity determination flags FLj and FLk are fed to the inertia compensation energization amount calculation block IJK (IJT and IKT) and inertia compensation energization amounts Ijt and Ikt are calculated based on a preset time-series patterns (calculation maps) CHj and CHk.

In the control necessity determination calculation block FLG, a delay element calculation block DLY can be provided. In the delay element calculation block DLY, the operation amount Bpa is subject to a delay element calculation processing, and it is possible to calculate the operation acceleration ddfBp based on the resultant operation amount fBp. In the delay element calculation block DLY, the response (how the output changes in response to the input change) from the brake actuator BRK (particularly, the electric motor MTR) is taken into consideration of a transfer function with the delay element. The term "delay element" used herein is an n-th order delay element (where "n" is an integer of "1" or more) and is, for example, the primary delay element. Specifically, the delay element calculation (e.g., the primary delay calculation) is executed using a time constant τm that indicates the response from the brake actuator BRK. The response from the brake actuator BRK is taken into consideration of the delay element, which enables the proper inertia compensation control.

In the control necessity determination calculation block FLG, whether or not the inertia compensation control is necessary is determined based on the operation acceleration ddBp (or the operation acceleration ddfBp subjected to the calculation processing with the above-mentioned delay element). Alternatively, however, instead of the ddBp or ddfBp, it is possible to employ a target pushing-force acceleration ddFb (or the ddfFb subjected to the above-mentioned delay calculation processing) which is calculated by subjecting the target pushing-force Fbt (or the fFb obtained after the above-mentioned delay calculation processing) to the second-order differentiation. In addition, in a case where, as a target value, the position (e.g., target rotation angle) Mkt of the electric motor is used, for the necessity determination, it is possible to employ a target rotation acceleration ddMK (a ddfMk subjected to the above-mentioned delay calculation processing) that is calculated by subjecting the target rotation angle Mkt (or an fMk obtained after the above-mentioned processing) to the second-order differentiation. In other words, it is possible to determine the necessity of the inertia compensation control based on a value that is equivalent to the acceleration of the braking operation (acceleration equivalent value) ddBp, ddFb, and ddMk, and is obtained by subjecting the braking operation amount Bpa to the second-order differentiation (or the ddfBp, ddfFb, and ddfMk obtained after the above-mentioned delay calculation processing).

It is to be noted that, in the above-mentioned INR of the first embodiment (see FIG. 4), both the determination calculation (calculation of FLj) during acceleration of the electric motor and the determination calculation (calculation of FLk) during deceleration of the electric motor are executed based on the operation speed (speed equivalent value) dBp or the like, while in the INR of the second embodiment (see FIG. 6), both the during-acceleration determination calculation (calculation of FLj) and the during-deceleration determination calculation (calculation of the FLk) are executed based on the operation acceleration (acceleration equivalent value) ddBp or the like. In addition, the control necessity determination calculation block FLG may include the combination of the "the FLj calculation based on the dBp or the like" and "the FLk calculation based on the ddBp or the like". Alternatively, the control necessity determination calculation block FLG may include the combination of the "the FLj calculation based on the ddBp or the like" and "the FLk calculation based on the dBp or the like".

<Configuration of Inertia Compensation Control Block of Third Embodiment>

Figure 7:
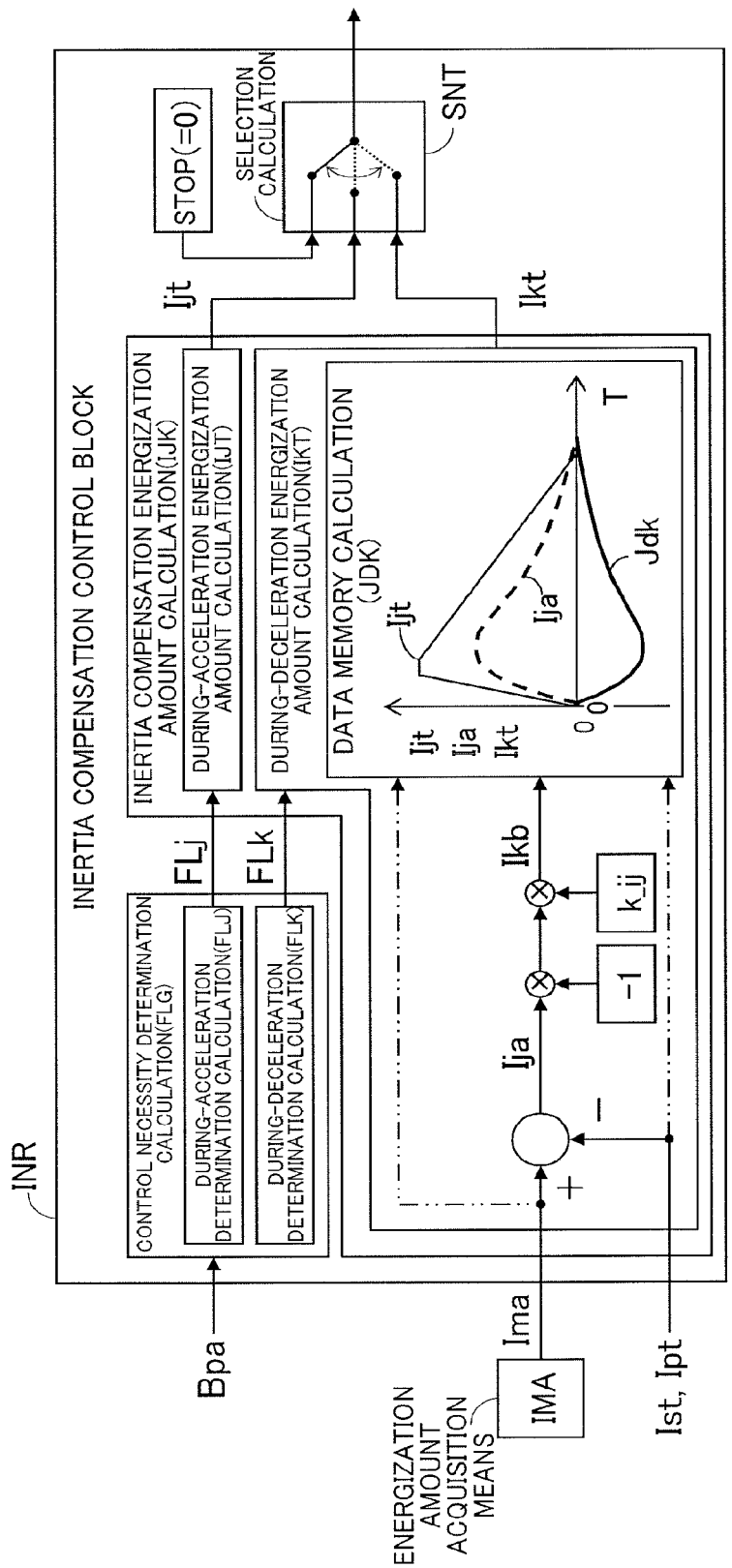
FIG. 7 is a functional block diagram illustrating the inertia compensation control block that is illustrated in FIG. 3 according to a third embodiment of the present invention.

Next, with reference to FIG. 7, the inertia compensation control block INR according to a third example of the present invention is described. Even when the during-acceleration inertia compensation energization amount Iji is output as a value in which the responsiveness of the electric motor MTR is taken into consideration, the actual energization amount to the electric motor MTR does not always match the target value depending on a condition of the power supply voltage (e.g., when a voltage drops). For example, in a case where the actual energization amount is insufficient when the electric motor MTR starts up, if the preset during-deceleration inertia compensation energization amount Ikt is output, an insufficient pushing-force may be generated in the brake actuator BRK. For this reason, in this embodiment, based on an actual energization amount (e.g., current value) Ima that is acquired by the energization amount acquisition means (e.g., current sensor) IMA, the during-deceleration inertia compensation energization amount Ikt can be calculated.

As illustrated in FIG. 7, this inertia compensation control block INR includes the control necessity determination calculation block FLG, the inertia compensation energization amount calculation block IJK, and the selection calculation block SNT. The FLG and the SNT are the same as those in the first and second embodiments that are illustrated in FIG. 4 and FIG. 6, respectively, and hence the detailed descriptions thereof are omitted. Hereinafter, only the inertia compensation energization amount calculation block IJK is described.

The inertia compensation energization amount calculation block IJK includes the during-acceleration energization amount calculation block IJT and the during-deceleration energization amount calculation block IKT. The during-acceleration energization amount calculation block IJT is the same as the INR of the first embodiment that is illustrated in FIG. 4 and thus the detailed description thereof is omitted.

The during-deceleration energization amount calculation block IKT is provided with a data memory calculation block JDK for storing the time-series data Jdk based on the actual energization amount Ima over the period in which the Ijt is output. The actual energization amount Ima is acquired by the energization amount acquisition means (e.g., current sensor) IMA in correspondence to the during-acceleration inertia compensation energization amount Ijt. The time-series data Jdk is stored in the data memory calculation block JDK, as the characteristics that indicate the actual energization amount Ija corresponding to the Ijt, with respect to a lapse of time T. Then, based on the time-series data Jdk, the during-deceleration inertia compensation energization amount Ikt is calculated.

In the during-deceleration energization amount calculation block IKT, first, the indication energization amount Ist and the feed-back energization amount Ipt is removed (subtracted) from the actual energization amount Ima, thereby calculating the actual energization amount (actual value) Ija that corresponds to the during-acceleration inertia compensation energization amount (target value) Ijt. In other words, the energization amount Ija that corresponds to the Ijt is calculated by removing a component resulted from the Ist and an component resulted from the Ipt from the Ima. Then, the corresponding energization amount Ija is multiplied by "−1" (inversion of sign) and further is multiplied by a coefficient k_ij, thereby calculating an energization amount Ikb that is stored in the data memory calculation block JDK.

In the data memory calculation block JDK, the memory energization amount Ikb, that is stored as the time-series data set Jdk, is related to a time T that elapses from a time point (T=0) at which the during-acceleration control necessity determination flag FLj is transferred from "0 (unnecessary state)" to "1 (necessary state)" (i.e., a time elapse from the initiation of the during-acceleration inertia compensation control). Further, the time-series data set Jdk based on the actual energization amount Ima serves as a characteristic (calculation map) for calculating the Ikt. Base on the time T that elapses from a time point (T=0) at which the during-deceleration control necessity determination flag FLk is transferred from "0 (unnecessary state)" to "1 (necessary state)" and the Jdk, the during-deceleration inertia compensation energization amount Ikt is calculated.

While it is necessary to generate a torque for overcoming frictions at the bearings and the like of the electric motor MTR during acceleration (particularly, initiation) thereof, due to the fact that such frictions act on the MTR to decelerate during deceleration (when being intended to stopped), the coefficient k_ij may be set to be less than "1".

In the above descriptions, the memory energization amount Ikb is calculated every calculation period. Instead, it is possible to calculate the characteristic Jdk by storing values of the Ima, Ist, and Ipt that are related to the elapsed time T as time-series data sets, and using those values. In other words, it is possible to determine the characteristic (calculation map) Jdk based on a calculation: the time-series data set of Jdk=(−1)×(k_ij)×{(the time-series data set of Ima)−(the time series data set of Ist)−(the time series data set of Ipt)}.

In the INR of the third embodiment, the during-deceleration inertia compensation control is executed based on the actual energization amount Ima that is obtained in the execution of the during-acceleration inertia compensation control, and hence an adequate execution of inertia compensation control can be performed even when an error occurs between the target value and the actual value which is affected by the power supply and the like.

<Configuration of Inertia Compensation Control Block of Fourth Embodiment>

Figure 8:
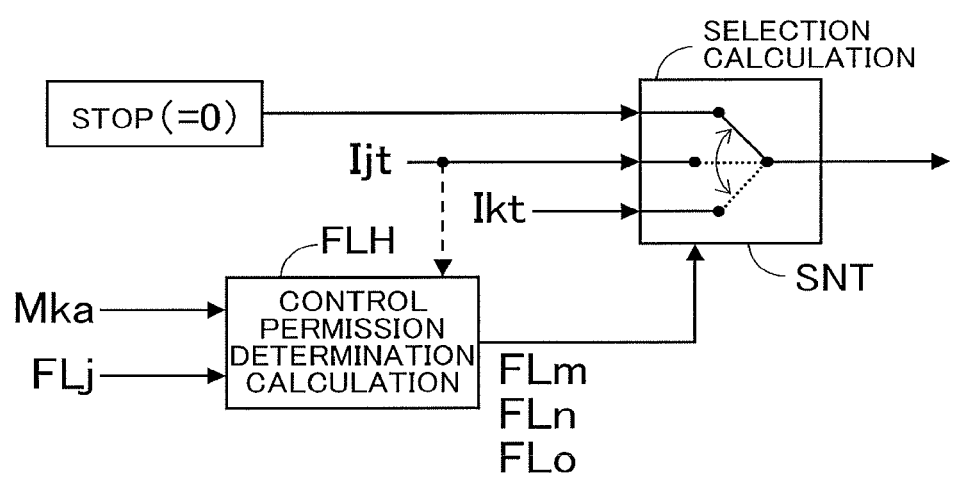
FIG. 8 is a functional block diagram illustrating the inertia compensation control block that is illustrated in FIG. 3 according to a fourth embodiment of the present invention.

Next, with reference to FIG. 8, the inertia compensation control block INR according to a fourth embodiment of the present invention is described. In this embodiment, there is provided a control permission determination calculation block FLH, and based on a determination result of the FLH, it is possible to determine a selection condition (switching among the Ijt, the Ikt, and control stop) of the selection calculation block SNT that is described in the INRs of the first to third embodiments (see FIG. 4, FIG. 6, and FIG. 7). The control permission determination calculation block SNT is fed with the inertia compensation energization amount Ijt or Ikt similar to that in each of the first to third embodiments.

In the control permission determination calculation block FLH, it is determined whether an execution of the during-acceleration inertia compensation control (i.e., calculating the Ijt) is "permitted (FLm=1)" or "prohibited (FLm=0)" based on the actual position (real position, e.g., the rotation angle of the electric motor) Mka that is acquired by the position acquisition means (e.g., the rotation angle sensor of the electric motor) MKA.

In the control permission determination calculation block FLH, based on the real position Mka, a speed (rotation speed) dMka of the electric motor MTR is calculated. If the rotation speed dMka of the electric motor MTR is less than a predetermined speed (predetermined value) dm1, the control is permitted to be executed, resulting in outputting "1" as the permission determination flag FLm. On the other hand, if the rotation speed dMka of the electric motor MTR is equal to or greater than the predetermined speed (predetermined value) dm1, the control is prohibited to be executed, resulting in outputting "0" as the permission determination flag FLm. Then, in the selection calculation block SNT, in a case where permission determination flag FLm is "0", "0 (control stop)" is selected, while in a case where the permission determination flag FLm is "1", the during-acceleration inertia compensation energization amount Ijt is selected.

The permission determination of the inertia compensation control may be established based on whether or not the electric motor MTR is at rest with reference to the real position Mka. In a case where the electric motor is at rest (whose rotation speed is zero), the control is permitted to be executed, resulting in outputting "1" as the permission determination flag FLm. On the other hand, in a case where the electric motor is in motion (e.g., is in a rotation movement, generating a rotation speed), the control is prohibited to be executed, resulting in outputting "0" as the permission determination flag FLm. Then, in the selection calculation block SNT, in a case where the permission determination flag FLm is "0", "0 (control stop)" is selected, while in a case where the permission determination flag FLm is "1", the during-acceleration inertia compensation energization amount Ijt is selected.

Immediately before the determination of the above-mentioned during-acceleration inertia compensation control is determined to be necessary (immediately before the FLj is switched from "0" to "1"), in a case where the rotation speed of the electric motor is high (dMka≥dm1) or in a case where the electric motor is already in motion (in rotation movement) (dMka≠0), compensating for the inertia of the electric motor or the like is not in high necessity, which prohibits the execution of the inertia compensation control. The during-acceleration inertia compensation control is executed only when the electric motor rotates at low speed (dMka<dm1) or at rest (dMka=0), and hence the inertia compensation control is executed with high reliability.

In the control permission determination calculation block FLH, based on the actual position Mka that is acquired by the position acquisition means MKA, it is determined whether executing the during-deceleration inertia compensation control (i.e., calculating the Ikt) is "permitted (FLn=1)" or "prohibited (FLn=0)". Based on the actual speed Mka, the peed (rotation speed) dMka of the electric motor is calculated. In a case where the actual rotation speed dMka of the electric motor MTR is equal or larger than the predetermined speed (predetermined value) dm1 (dMka≥dm1), executing the control is permitted, resulting in outputting "1" as the permission determination flag FLn. On the other hand, in a case where the actual rotation speed dMka of the electric motor is less than the predetermined speed (predetermined value) dm1 (dMka<dm1), executing the control is prohibited, resulting in outputting "0" as the permission determination flag FLn. Then, in the selection calculation block SNT, in a case where the permission determination flag FLn is "0", "0 (control stop)" is selected, while in a case where the permission determination flag FLn is "1", the during-deceleration inertia compensation energization amount Ikt is selected.

It is possible for the during-deceleration inertia compensation control to suppress the overshoot of the electric motor MTR. However, in a case where the electric motor is not in high speed motion, the during-deceleration inertia compensation control is in low necessity, and hence the inertia compensation control is prohibited in a case where the rotation speed of the electric motor is low (in a case of dMka<dm1).

In addition, in the control permission determination calculation block FLH, based on at least one of the energization amount (target value) Ijt of the during-acceleration inertia compensation control and the necessity determination flag FLj, it is determined whether executing the during-deceleration inertia compensation control (i.e., calculating the Ikt) is "permitted (FLo=1)" or "prohibited (FLo=0)". Prior to the above-mentioned determination of the necessity of during-deceleration inertia compensation control (during-deceleration control), based on whether or not the during-acceleration inertia compensation control (during-acceleration control) is executed, it is determined whether the during-deceleration control is permitted or prohibited. In a case where the during-acceleration control is not executed, the determination is to be "prohibited," resulting in outputting "0" as a permission determination flag FLo. On the other hand, in a case where the during-acceleration control is executed, the determination is to be "prohibited," resulting in outputting "1" as the permission determination flag FLo. In the selection calculation block SNT, in a case where the permission determination flag FLo is "0 (prohibited state)", "0 (control stop)" is selected, while in a case where the permission determination flag FLo is "1 (permitted state)", the during-deceleration inertia compensation energization amount Ikt is selected.

In a case where the inertia compensation control is unnecessary during acceleration of the electric motor MTR, during deceleration thereof, the of necessity is low. With the above-mentioned configuration, the during-deceleration control is executed only when the "necessary state" is determined during acceleration, which can improve the inertia compensation control reliability, thereby allowing execution of the control with reliability.

Furthermore, in the selection calculation block SNT, even though the during-acceleration energization amount Ijt is not reduced to as low as "0" (i.e., the during-acceleration inertia compensation control is not completed), in a case where the during-deceleration energization amount Ikt is output, the Ijt is set to be "0", which allows the selection calculation block SNT to output therefrom the during-deceleration energization amount Ikt. Giving the Ikt a higher priority than the Ijt makes it possible to adequately prevent the overshoot of the electric motor MTR and a surplus pushing force in a case where a braking operation is made abruptly but the operation amount is small.

Now, regarding the inertia compensation control in the inertia compensation control block INR, operation and effect that are common to the first to fourth embodiments are described. The inertia compensation control is a control for adjusting the energization amount (Ijt, Ikt) relative to the target energization amount Imt, the energization amount (Ijt, Ikt) corresponding to the force (torque) that is necessary for the moving parts (including the MTR) of the device having an inertia to accelerate or decelerate. In detail, the energization amount is compensated for (corrected) by increasing the target energization amount during acceleration of the electric motor, while the energization amount is compensated for (corrected) by decreasing the target energization amount during deceleration of the electric motor.

In order to ensure the responsiveness of the braking torque during acceleration of the electric motor MTR (particularly, at its initiation), it is important to improve the start-up of the electric motor MTR (motion initial stage from at rest) by compensating for the influences of the inertia of the electric motor MTR and static frictions of the bearings and the like. According to the above-mentioned first to fourth embodiments, after the time point at which executing the during-acceleration inertia compensation control is determined to be necessary, it is possible to output the inertia compensation energization amount Ijt that is in the form of the first preset time-series pattern CHj. The CHj is set based on the maximum response (how the actual displacement Mka of the MTR changes in response to the change of the step input of the target energization amount) of the braking actuator BRK (particularly, the electric motor MTR). Thus, it is possible to adequately compensate for the influences of the inertia of the BRK and to compensate for the influences of the static frictions of the bearings and the like of the electric motor MTR and the like, resulting in remarkable improvement of the responsiveness of the braking torque when the electric motor MTR begins to be in motion.

Likewise, during deceleration of the electric motor MTR (in the case of the transfer from motion state to rest state), it is also important to compensate for the inertia at the initial stage of the deceleration of the electric motor MTR. According to the above-mentioned first to fourth embodiments, after the time point at which executing the during-deceleration inertia compensation control is determined to be necessary, it is possible to output the inertia compensation energization amount Ikt that is in the form of the second preset time-series pattern CHk. The CHk is set based on the maximum response (how the actual displacement Mka of the MTR changes in response to the change of the step input of the target energization amount) of the braking actuator BRK (particularly, the electric motor MTR). Thus, it is possible to adequately compensate for the influences of the inertia of the BRK, resulting in an increase of the deceleration of the electric motor MTR immediately after the electric motor MTR begins to decelerate, followed by a remarkable suppression of the overshoot of the braking torque. In summary, according to the first to fourth embodiments, it is possible to effectively and adequately compensate for the influences of the inertia of the braking means BRK that includes the inertia of the electric motor MTR.

<Configuration of Inertia Compensation Control Block of Fifth Embodiment>

Figure 9:
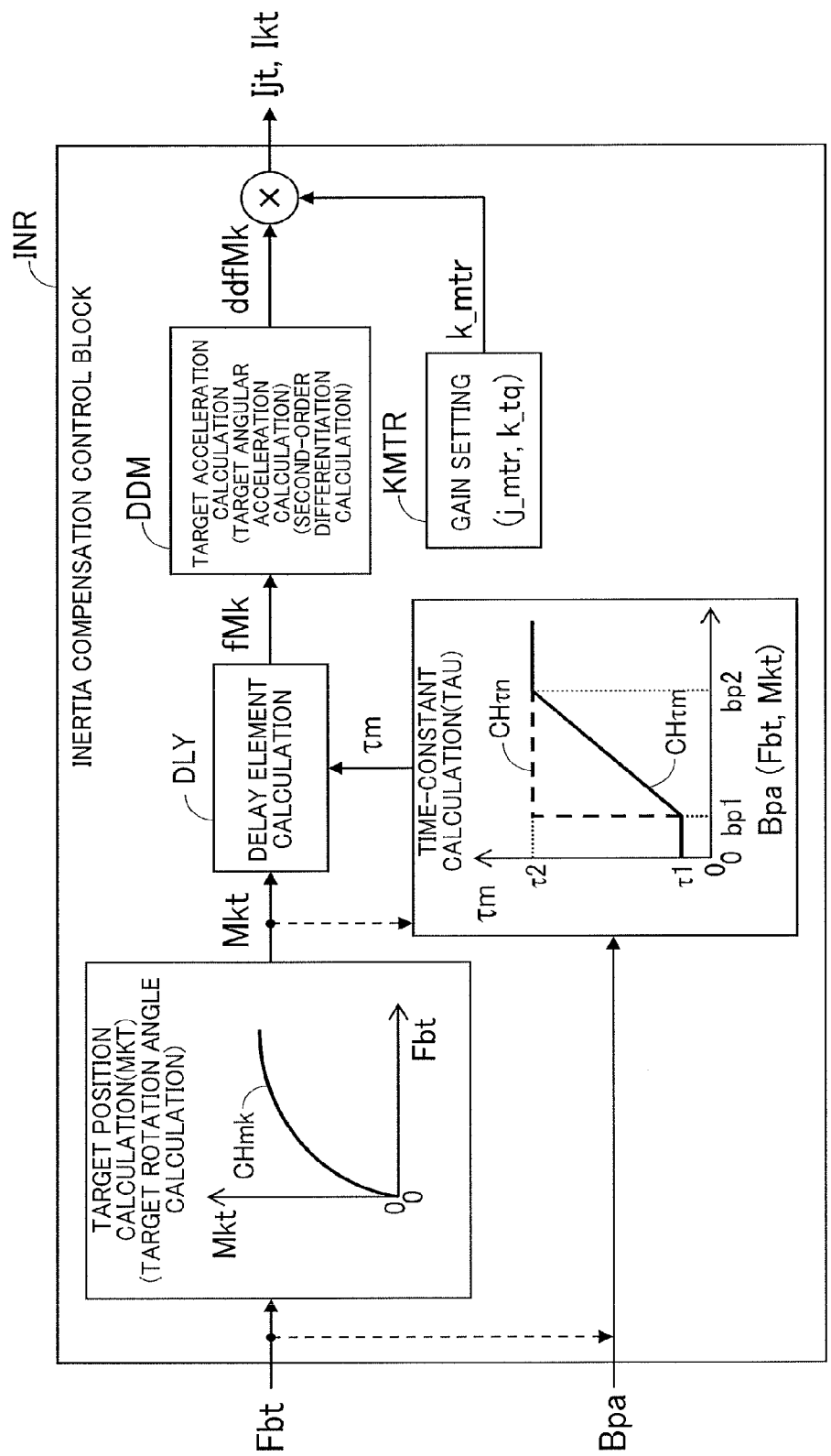
FIG. 9 is a functional block diagram illustrating the inertia compensation control block that is illustrated in FIG. 3 according to a fifth embodiment of the present invention.

With reference to FIG. 9, the inertia compensation control block INR according to a fifth embodiment of the present invention is described. For the preparation thereof, as detailed below, various codes are defined. Each code affixed with "f" is a state amount (fMk or the like) which is obtained by subjecting its original state amount (Mkt or the like) to calculation processing using the delay element with the time constant τm as described later and which is referred to as "processed value". It is to be noted that the "original state amount (original value)" is a value before the calculation processing (delay processing) using the delay element and is referred to as "unprocessed value". In addition, each code affixed with "d" is a state amount (dfMk or the like) which is obtained by subjecting the original state amount (fMk or the like) to first-order differentiation and corresponds to speed. This state amount (value obtained by subjecting the "original state amount" to first-order differentiation) is referred to as "speed value" or "speed equivalent value". A state amount (dfMk or the like) which is obtained by subjecting the processed value (fMk or the like) to first-order differentiation is referred to as "processed speed value (post-process speed value)" or "processed speed equivalent value (post-process speed equivalent value)". Moreover, each code affixed with "dd" is a state amount (ddfMk or the like) which is obtained by subjecting the original state amount (fMk or the like) to second-order differentiation and corresponds to acceleration. This state amount (value obtained by subjecting the "original state amount" to second-order differentiation) is referred to as "acceleration value" or "acceleration equivalent value". A state amount (ddfMk or the like) obtained by subjecting the processed value (fMk or the like) to second-order differentiation is referred to as "processed acceleration value (post-process acceleration value)" or "processed acceleration equivalent value (post-process acceleration equivalent value)".

As illustrated in FIG. 9, in this inertia compensation control block INR, an inertia compensation control is executed in order to improve the responsiveness of the pushing force caused by the inertia of the MTR and the like (the inertia of the entire BRK that includes the inertia of the MTR) and the convergence thereof. The inertia compensation control block INR includes a target position calculation block MKT, a time-constant calculation block TAU, a delay element calculation block DLY, a target acceleration calculation block DDM, and a gain setting block KMTR.

In the target position calculation block MKT, based on a target pushing force Fbt and a target pushing-force calculation characteristic (calculation map) CHmk, the target position (target rotation angle) Mkt is calculated. The target position Mkt is a target value of the position (rotation angle) of the electric motor MTR. The calculation map CHmk, which corresponds to rigidities of the brake caliper CPR and the friction members (brake pads) MSB, is pre-stored, as a non-linear "concave-down" characteristic, in the electronic control unit ECU.

In the time-constant calculation block TAU, based on the braking operation amount Bpa and a time-constant calculation characteristic (calculation map) CHτm, the time constant τm is calculated. As used herein, the "time constant" is a parameter that is indicative of a speed of a response (how the output changes in response to the change of the input) in the "delay element" to be detailed later. In a case where the operation amount Bpa is less than a predetermined operation amount (predetermined value) bp1, the τm is calculated to be a first predetermined time constant (predetermined value) τ1 (≥0). In a case where the Bpa is equal to or larger than the predetermined value bp1 and concurrently is less than a predetermined value bp2, the τm is calculated to sequentially increase from the first predetermined time constant τ1 to a second predetermined time constant τ2 depending on an increase of the Bpa. In a case where the Bpa is equal to or larger than the predetermined amount bp2, the τm is calculated to be a second predetermined time constant (predetermined value) τ2 (>τ1).

Instead, it is possible to calculate the time constant τm based on a calculation characteristic (calculation map) CHτn. In the calculation map CHτn, in a case where the Bpa is less than the predetermined value bp1, the τm is calculated to be the predetermined value τ1 (≥0), while in a case where the Bpa is equal to or larger than the predetermined value bp1, the τm is calculated to be the predetermined value τ2 (>τ1). In each calculation characteristic CHτm or CHτn, when the braking operation amount Bpa is small, in order not to execute the delay element based calculation processing, the predetermined value τ1 may be set to be "0".

In the delay element calculation block DLY, based on the target position Mkt of the electric motor MTR, the target position (processed value) fMk that is the result of the delay element based calculation processing. In detail, the calculation processing that uses the delay element (e.g., first-order delay element) that includes the time constant τm corresponding to the response of the brake actuator BRK (i.e., the response of the electric motor MTR) is executed with respect to the target position (original value) Mkt of the electric motor, thereby calculating the post-delay process target position (processed value) fMk. By subjecting the Mkt to the delay processing, the response of the brake actuator BRK is considered as a transfer function with the delay element instead of the "gradient limitation", allowing to calculate the target value fMk that corresponds to the response. In other words, the response of the BRK (how the temporal change amount of output varies in response to the temporal change amount of input to the system) is indicated by the transfer function with the delay element represented by the time constant, and hence the fMk can be calculated by using this transfer function. As used herein, the transfer function is a function that is indicative of a relationship between inputs to the system (control system) and their corresponding outputs, and the time constant is a parameter that is indicative of the response speed of the delay element.

As the delay element, an n-th order delay element (n is an integer of "1" or more) is available. The delay element is represented in terms of Laplace transformation and, for example, in a case of the first-order delay element, a transfer function G(s) is represented by the following expression (1).

$$G(s)=K/(\tau m \cdot s+1) \qquad (1),$$

where τm is a time constant, K is a constant, and s is Laplacian operator.

In addition, in a case where the delay element is a second-order delay element, the transfer function G(s) in the delay element calculation is represented by the following expression (2).

$$G(s)=K/\{s \cdot (\tau m \cdot s+1)\} \qquad (2)$$

Moreover, in the delay element calculation, an idle time may be considered. The idle time is a time that is required until the output begins in response to the input. In such a case, the transfer function G(s) that is indicative of the response of the BRK is represented by the following expression (3) (delay element calculation using first-order delay and the idle time) or expression (4) (delay element calculation using second-order delay and the idle time).

$$G(s)=\{K/(\tau m \cdot s+1)\} \cdot e^{-L \cdot s} \qquad (3)$$

$$G(s)=[K/\{s \cdot (\tau m \cdot s+1)\}] \cdot e^{-L \cdot s} \qquad (4)$$

where L is the idle time, and e is Napierian number (the base of natural logarithms).

In the target acceleration calculation block DDM, based on the post-delay process target position (processed value) fMk, the post-delay process target acceleration (processed acceleration value) ddfMK is calculated. The ddfMk is a target value of the acceleration (angular acceleration) of the electric motor MTR. In detail, the ddfMk is calculated by subjecting the fMk to second-order differentiation. The ddfMk is calculated to be a value with a plus sign during acceleration of the electric motor MTR (when starting from the stopped state), while the ddfMk is calculated to be a value with a minus sign during deceleration of the electric motor MTR (when intended to be stopped).

In the gain setting block KMTR, there is stored a coefficient (gain) k_mtr that is used in converting the post-delay process target acceleration (processed acceleration value) ddfMk into the target energization amount of the electric motor. The coefficient k_mtr corresponds to a value obtained by dividing the inertia (constant) j_mtr of the electric motor by the torque constant k_tq of the electric motor. Then, the inertia compensation control energization amount (target value) Ijt or Ikt is calculated based on the ddfMk and the k_mtr. In detail, each of the Ijt and the Ikt is calculated by multiplying the ddfMk by the k_mtr.

In the inertia compensation control block INR of the above-mentioned fifth embodiment (see FIG. 9), the target position (unprocessed value) Mkt is calculated based on the target pushing force Fbt, and the post-delay process target position (processed value) fMk is calculated by subjecting the resultant Mkt to the delay processing (e.g., first-order delay processing). Further, the target acceleration (processed acceleration value) ddfMk is calculated by subjecting the fMk to second-order differentiation, and the Ijt or Ikt is calculated based on the resultant ddfMk. Instead of these calculations, the post-delay process target pushing force (processed value and concurrently processed target pushing force) fFb may be calculated by subjecting the target pushing force (unprocessed value) Fbt to the delay processing, the target pushing-force acceleration (processed acceleration value) ddfFb may be calculated by subjecting the fFb to second-order differentiation, and the inertia compensation energization amount Ijt or Ikt may be calculated based on the resultant ddfFb. In addition, the post-delay process operation amount (processed value) fBp may be calculated by subjecting the Bpa to the delay processing, the operation acceleration (processed acceleration value) ddfBp may be calculated by subjecting the resultant fBp to second-order differentiation, and the inertia compensation energization amount Ijt or Ikt may be calculated based on the resultant ddfBp. In other words, in the inertia compensation control block INR, it is possible to calculate the processed value (value after filter processing) fBp, fFb, or fMk by subjecting the unprocessed value (Bpa, Fbt, or Mkt) that is calculated based on the operation amount Bpa of the braking operation member BP to the delay element calculation. Then, subjecting the processed value fBp, fFb, or fMk to second-order differentiation calculates the processed acceleration value (equivalent to the acceleration obtained by subjecting the processed value to second-order differentiation) ddfBp, ddfFb, or ddfMk, and the inertia compensation energization amount Ijt or Ikt is calculated based on the resultant processed acceleration value ddfBp, ddfFb, or ddfMk.

The torque that compensates for the inertia of the electric motor is in proportion to its rotation angular acceleration. For this reason, it is necessary to adequately calculate the rotation angular acceleration (or its equivalent value) of the electric motor in order to adequately perform the inertia compensation. In view of this, in the above-mentioned fifth embodiment, the response of the electric motor MTR is taken into consideration as the transfer function with the delay element using the time constant, instead of the "gradient limitation". In detail, an original state amount of any one of the unprocessed values Bpa, Fbt, and Mkt that are calculated based on the Bpa is subjected to calculation using a delay element (e.g., first-order delay element) having a time constant τm (time until the output reaches about 63.2% of the target value in response to a step input) corresponding to the response of the electric motor MTR, thereby calculating the processed value fBp, fFb, or fMk. Then, based on the resultant processed value fBp, fFb, or fMk, the processed acceleration value (equivalent to the acceleration obtained by subjecting the processed value to second-order differentiation) ddfBp, ddfFb, or ddfMk is calculated, to thereby adequately calculate the inertia compensation control target value Ijt or Ikt.

In the above-mentioned time-constant calculation block TAU, the time constant τm is calculated as a variable value based on the braking operation amount Bpa or the like. However, the time constant τm may be calculated as a predetermined value (fixed value).

Figure 10:
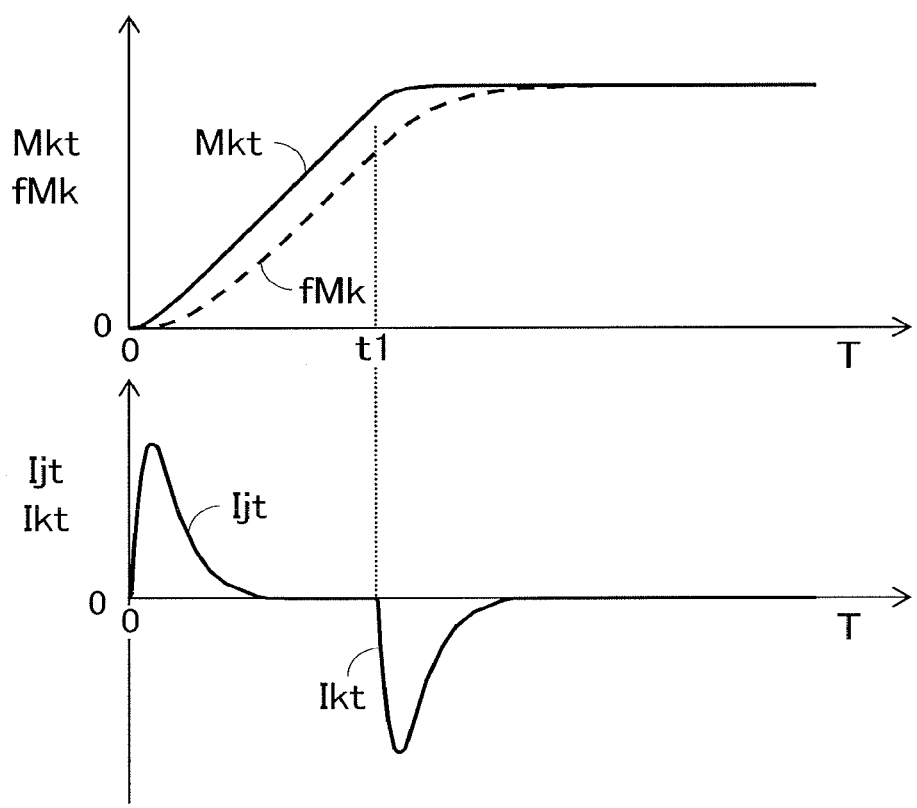
FIG. 10 is a graph showing operations and effects that are in association with calculation processing using a delay element.

FIG. 10 is a diagram corresponding to time T (time-series diagram) for describing operations and effects of the inertia compensation control block INR of the above-mentioned fifth embodiment. The brake actuator BRK that includes the electric motor MTR and other equipment is represented in terms of the transfer function (delay element calculation), and the time constant τm is employed as an indicator for indicating the speed of the response thereof. The target position (target rotation angle) Mkt is subjected to the calculation processing (delay processing) using the delay element with the τm, thereby calculating the post-process target position fMk. The post-process target acceleration ddfMk is calculated by subjecting the post-process target position fMk to second-order differentiation, and the ddfMk is converted into the energization amount for calculating the Ijt or Ikt. The response of the electric motor MTR is indicated by the transfer function in which the time constant τm is set instead of the "gradient limitation". Therefore, the target value of the energization amount to the electric motor MTR is adequately calculated at its starting-up (in the vicinity of time t0) or before its stopping (in the vicinity of time t1). As a result, the inertia compensation control is allowed to be executed in an adequate manner. Thus, the responsiveness of the electric motor MTR can be ensured and the overshoot can be suppressed.

In the preceding descriptions, the target position Mkt is subjected to the delay element based calculation processing. However, it is possible to subject at least one state amount among the operation amount Bpa, the target pushing force Fbt, and the target position Mkt to the delay element based calculation processing (delay processing). In addition, calculating the τm in the time-constant calculation block TAU uses the operation amount Bpa. However, it is possible to employ at least one original state amount (state amount before delay element based calculation processing) among the operation amount Bpa, the target pushing force Fbt, and the target position Mkt. Even in such a case, similarly to the above, it is possible to use the calculation map τm or τn.

<Configuration of Inertia Compensation Control Block of Sixth Embodiment>

Figure 11:
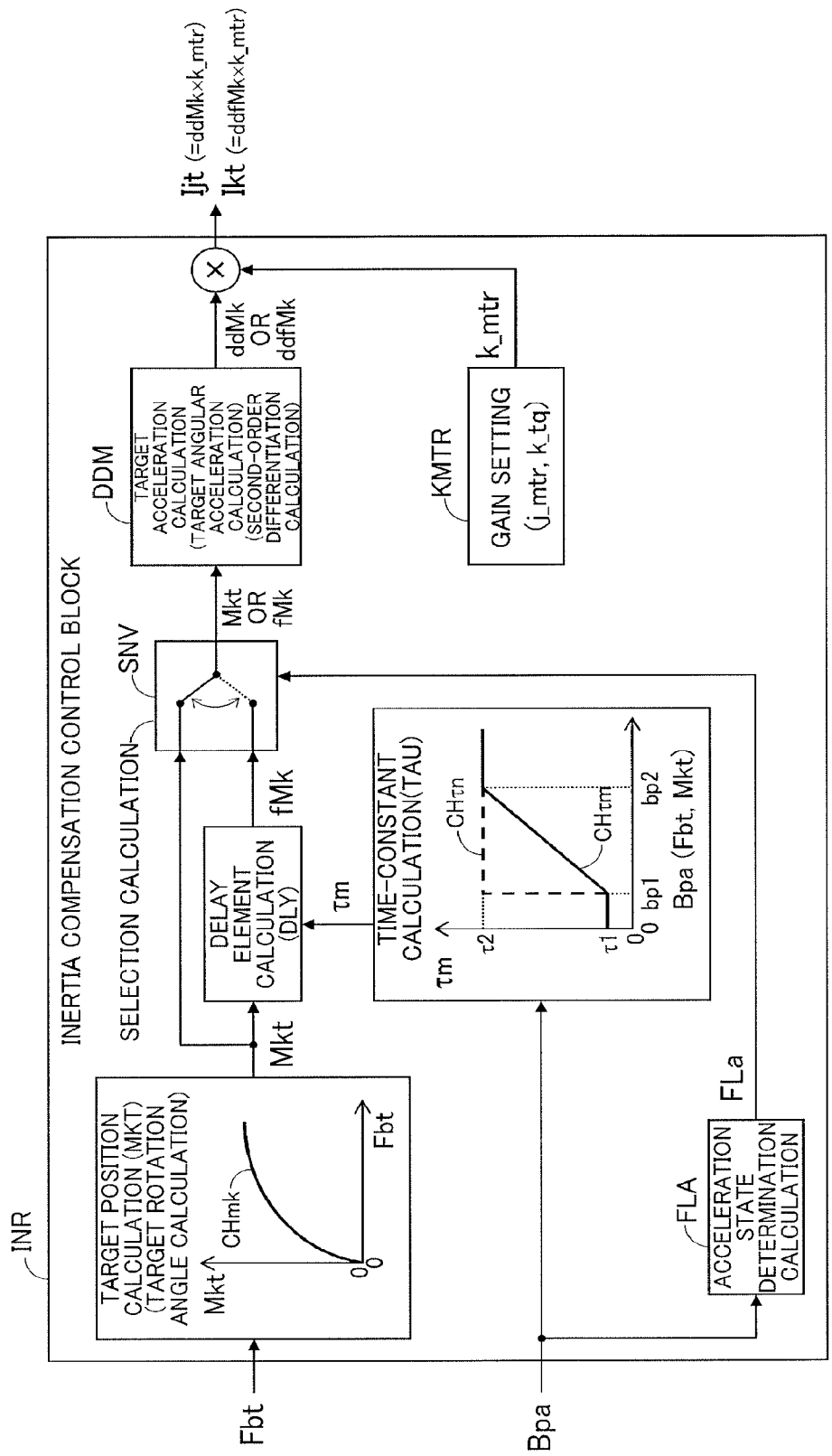
FIG. 11 is a functional block diagram illustrating the inertia compensation control block that is illustrated in FIG. 3 according to a sixth embodiment of the present invention.

Next, with reference to FIG. 11, the inertia compensation control block INR according to a sixth embodiment of the present invention is described. As illustrated in FIG. 11, in the INR of the sixth embodiment, it is determined, based on the operation amount Bpa, whether or not the motion state of the electric motor MTR is in an "acceleration state," when the acceleration state is determined, the delay element calculation is not executed, while only when the acceleration state is not determined, the delay element calculation is executed.

The inertia compensation control block INR includes a target position calculation block MKT, a time-constant calculation block TAU, a delay element calculation block DLY, an acceleration state determination calculation block FLA, a selection calculation block DDM, a target acceleration calculation block DDM, and a gain setting block KMTR. The target position calculation block MKT, the time-constant calculation block TAU, the delay element calculation block DLY, and the target acceleration calculation block DDM are the same as those in the INR of the fifth embodiment (see FIG. 9) and thus the detailed descriptions thereof are omitted.

In the acceleration state determination calculation block FLA, based on the operation amount Bpa of the braking operation member, it is determined whether or not the motion state of the electric motor MTR which corresponds to the operation is the acceleration state. In detail, based on the operation amount Bpa, the acceleration (unprocessed acceleration value) ddBp of the braking operation is calculated, and when the resultant ddBp is equal to or larger than a predetermined acceleration (predetermined value) ddb0 (ddBp≥ddb0), it is determined to "be in the acceleration state (acceleration state)". On the other hand, when the resultant ddBp is less than the predetermined acceleration (predetermined value) ddb0 (ddBp<ddb0), it is determined to "not be in the acceleration state (out-of-acceleration state)". From the acceleration state determination calculation block FLA, a determination flag FLa is output, which is indicative of the determined result. Regarding the determination flag FLa, its value "1" is indicative of the "acceleration state", while its value "0" is indicative of the "out-of-acceleration state".

In the selective means SNV, based on the acceleration state determination flag FLa, any one of the target position (processed value) fMk which is obtained after being processed by the delay element calculation and the target position (unprocessed value) Mkt which is not processed by the delay element calculation is determined (selected). In the selection calculation block SNV, in a case of FLa=1 (acceleration state), the target position (pre-process target position) Mkt which is not processed by the delay element calculation is selected, while in a case of FLa=0 (out-of-acceleration state), the target position (post-process target position) fMk obtained after being processed by the delay element calculation is selected.

In the target acceleration calculation block DDM, the second-order differentiation is performed based on the target position (one of unprocessed values) Mkt obtained without the delay element calculation or the target position (one of processed values) fMk obtained via the delay element calculation. Then, a target acceleration ddMk or ddfMk is calculated which corresponds to one of the target positions Mkt and fMk. Here, the ddMk and the ddfMk are the target values of the acceleration (angular acceleration) of the electric motor MTR. Here, the unprocessed target acceleration ddMk obtained without the delay element calculation is calculated during acceleration (when starting from the stopped state) of the electric motor MTR and is thus assigned with a plus sign. On the other hand, the post-process target acceleration ddfMk obtained via the delay element calculation is calculated during deceleration (when intended to be stopped) of the electric motor MTR and is thus assigned with a minus sign.

In the gain setting block KMTR, there is stored a coefficient (gain) k_mtr that is used for converting the target acceleration ddMk (unprocessed acceleration value) or ddfMk (processed acceleration value) into the energization amount. The k_mtr corresponds to a value obtained by dividing the inertia (constant) j_mtr of the electric motor by the torque constant k_tq of the electric motor. Then, based on the ddfMk and the k_mtr, the inertia compensation energization amount (target value) Ijt or Ikt is calculated.

In a case where the "acceleration state" is determined (FLa=1), based on the target acceleration obtained without the delay element calculation (target acceleration calculated based on unprocessed value or unprocessed acceleration value) ddMk and the k_mtr, Ijt=ddMK×k_mtr allows to calculate the during-acceleration inertia compensation energization amount Ijt. In other words, the during-acceleration inertia compensation energization amount Ijt is calculated based on the unprocessed value that is obtained without the delay element calculation.

On the other hand, in a case where the "acceleration state" is not determined (FLa=0), based on the target acceleration obtained via the delay element calculation (target acceleration calculated based on processed value or processed acceleration value) ddfMk and the k_mtr, Ikt=ddfMK×k_mtr allows to calculate the during-deceleration inertia compensation energization amount Ikt. In other words, the during-deceleration inertia compensation energization amount Ikt is calculated based on the processed value obtained via the delay element calculation.

In the sixth embodiment, based on any one state amount of the target position (unprocessed value) Mkt calculated based on the target pushing force Fbt and the fMk (processed value) obtained by subjecting the Mkt to the delay processing, the target acceleration (ddMk or ddfMk) is calculated to calculate the inertia compensation energization amount Ijt or Ikt. Instead, as the original state amount (original value) for calculating the Ijt or Ikt, it is possible to employ at least one state amount among the operation amount Bpa, the target pushing force Fbt, and the target position Mkt.

In a case where the target pushing force Fbt is used as the original value, the processed target pushing force fFb is calculated, and based on the determination flag FLa, the selection calculation block SNV selects any one of the unprocessed target pushing force Fbt and the processed target pushing force fFb. Then, the selected target pushing force (Fbt or fFb) is subjected to second-order differentiation for calculating the target pushing-force acceleration value (ddFb or ddfFb), and based on the resultant target pushing-force acceleration value, the inertia compensation energization amount Ijt or Ikt is calculated.

In a case where the operation amount Bpa is used as the original state amount, the processed operation amount fBp is calculated, and based on the determination flag FLa, the selection calculation block SNV selects any one of the unprocessed operation amount Bpa and the processed operation amount fBp. Then, the selected operation amount (Bpa or fBp) is subjected to second-order differentiation for calculating the operation amount acceleration value (ddBp or ddfBp), and based on the resultant operation amount acceleration value, the inertia compensation energization amount Ijt or Ikt is calculated.

According to the sixth embodiment, in a case where the motion state of the electric motor MTR is the acceleration state, the during-acceleration inertia compensation energization amount Ijt is calculated by bypassing the delay element calculation, and hence the responsiveness of the pushing force can be improved. In addition, in a case where the motion state of the electric motor MTR is the out-of-acceleration state, the during-deceleration inertia compensation energization amount Ikt is calculated by involving therein an execution of the delay element calculation, and hence the overshoot of the pushing force is suppressed with reliability, thereby improving the convergence.

<Configuration of Inertia Compensation Control Block of Seventh Embodiment>

Figure 12:
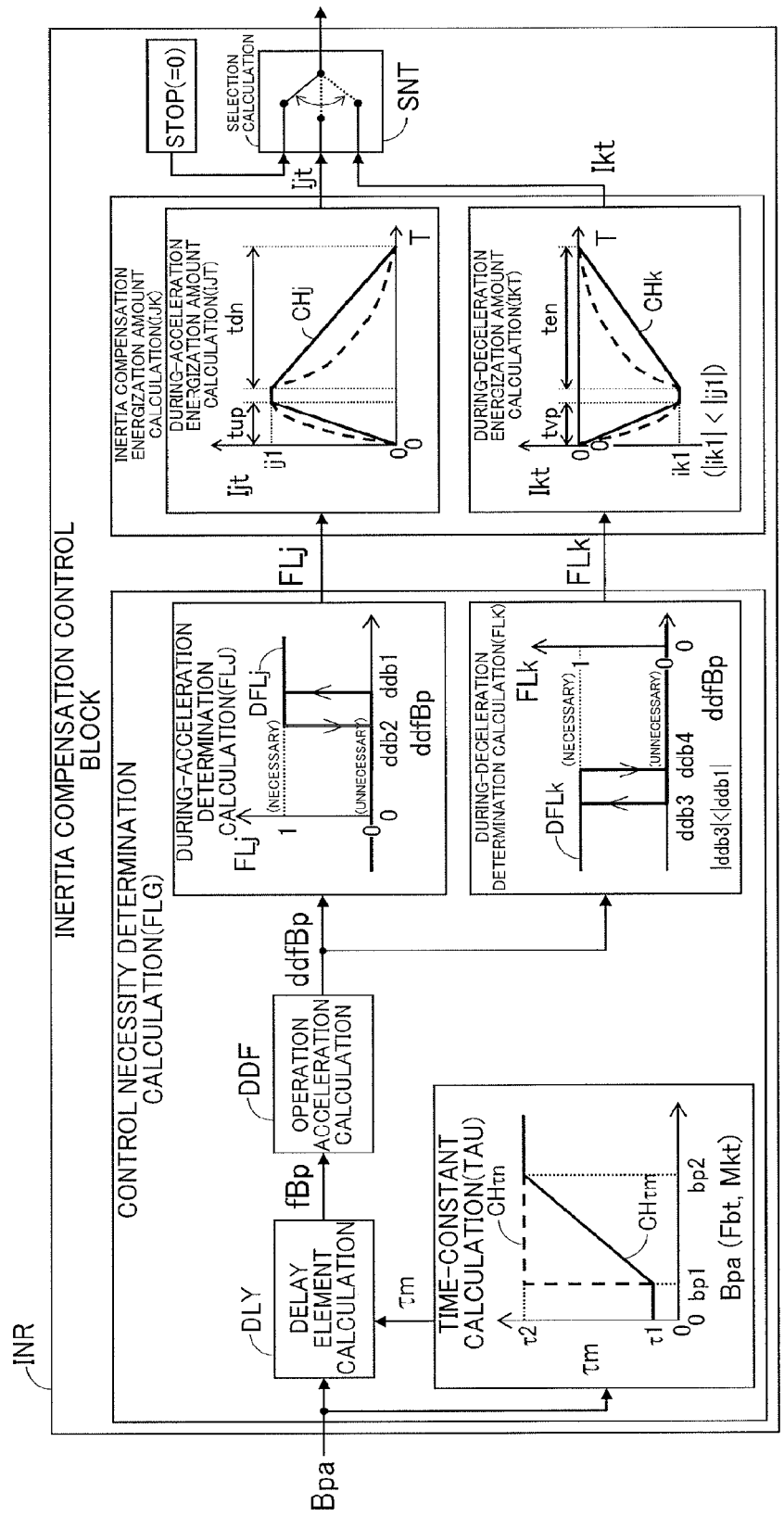
FIG. 12 is a functional block diagram illustrating the inertia compensation control block that is illustrated in FIG. 3 according to a seventh embodiment of the present invention.

Next, with reference to FIG. 12, an inertia compensation control block INR according to a seventh embodiment of the present invention is described. In the above-mentioned INRs of the fifth and sixth embodiments (see FIG. 9 and FIG. 11), based on the acceleration value (the ddfMk or the like), the Ijt and the Ikt are calculated. Instead, in the INR of the seventh embodiment, based on the acceleration value ddfBp, ddfFb, or ddfMk after being executed in the delay element calculation, it is determined whether or not the inertia compensation control is necessary, and when the inertia compensation control is determined to be necessary, based on the preset pattern characteristic, calculating the inertia compensation energization amount Ijt, Ikt become possible.

The inertia compensation control block INR includes a time-constant calculation block TAU, a delay element calculation block DLY, an operation acceleration calculation block DDF, an inertia compensation control necessity determination control block FLG, and an inertia compensation control energization calculation block IJK.

The time-constant calculation block TAU and the delay element calculation block DLY are the same as those of the above-mentioned INR according to the fifth embodiment (see FIG. 9) and thus descriptions thereof are omitted. In the delay element calculation block DLY, an after-delay-element processing operation amount (processed value) fBp is calculated based on the delay element calculation that takes into consideration of the operation amount Bpa and the time constant τm (that corresponds to the transfer function of the power derived from the brake actuator BRK).

In the operation acceleration calculation block DDF, the processed operation amount fBp is subjected to second-order differentiation, thereby calculating a processed operation acceleration (processed acceleration value) ddfBp. In detail, an after-delay-element processing operation amount fBp is differentiated to calculate an operation speed (processed speed value) dfBp and then the dfBp is differentiated to calculate the operation acceleration (processed acceleration value) ddfBp.

In the control necessity determination block FLG, it is determined whether or not an execution of the inertia compensation control is necessary. In the control necessity determination calculation block FLG, a necessity determination flag FLj is calculated and output which indicates a determination result of whether or not the inertia compensation control during acceleration is necessary, and a necessity determination flag FLk is calculated and output which indicates a determination result of whether or not the inertia compensation control during deceleration is necessary. Each of the necessity determination flags FLj and FLk is indicative of "1" in a case of "necessary state of control" and is indicative of "0" in a case of "unnecessary state of control".

The flag FLj that is indicative of the determination result regarding the during-acceleration control is set to be "0 (unnecessary state of control)" in a case where the braking operation is not performed. Pursuant to the calculation map DFLj, at a time point when the ddfBp exceeds the first predetermined acceleration (predetermined value) ddb1 (>0), the necessity determination flag FLj is switched from "0 (unnecessary state)" to "1 (necessary state)" (FLj←1). Thereafter, when the ddfBp becomes less than the predetermined acceleration ddb2 (<ddb1), the FLj is switched from "1" to "0".

Pursuant to the calculation map DFLk, at a time point when the ddfBp is less than the second predetermined acceleration (predetermined value) ddb3 (<0), the necessity determination flag FLk is switched from "0 (unnecessary state)" to "1 (necessary state)" (FLk←1). Thereafter, when the ddfBp becomes not less than the predetermined acceleration (predetermined value) ddb4 (>ddb3, <0), the FLk is switched from "1" to "0".

In the inertia compensation control energization amount calculation block IJK, the during-acceleration and during-deceleration inertia compensation energization amounts (target values) Ijt, Ikt are calculated.

Based on the control flag FLi that is indicative of the necessity determination result of the during-acceleration inertia compensation control and the during-acceleration control amount characteristic (first control amount characteristic and being in correspondence with the first pattern) CHj, the during-acceleration inertia compensation energization amount (first inertia compensation energization amount) Ijt is calculated. The during-acceleration control amount characteristic CHj is in advance stored in the ECU as the characteristic (calculation map) of the Ijt relative to an elapsed time T since the during-acceleration inertia compensation control is determined to be necessary. In the CHj, the Ijt increases abruptly from "0" to a predetermined energization amount (predetermined value) ij1 along with time from the time T of "0" and thereafter decreases gently from the predetermined energization amount (predetermined value) ij1 to "0" along with time. In detail, in the CHj, a time period tup that is required for the Ijt to increase from "0" to the predetermined energization amount ij1 is set to be shorter than a time period tdn that is required for the Ijt to decrease from the predetermined energization amount ij1 to "0".

As illustrated in FIG. 12 with broken lines, in a case where the energization amount increases, it is possible to set the Ijt, which has a "concave-down" characteristic, so as to first increase abruptly and thereafter increase gently. On the other hand, in a case where the energization amount decreases, it is possible to set the Ijt, which has a "concave-up" characteristic, so as to first increase abruptly and thereafter decrease gently. Then, the time point when the necessity determination flag FLj is switched from "0 (unnecessary state)" to "1 (necessary state)" is defined as an original time point (T=0) of the elapsed time in the CHj, and the inertia compensation energization amount during acceleration of the electric motor (first inertia compensation energization amount) Ijt is determined based on the elapsed time T measured from the switched time point and the during-acceleration control amount characteristic CHj. Even though the FLj is switched from "1" to "0" in the calculation of Ijt, the Ijt keeps being calculated over a continuation duration that is set in the calculation map CHj. It is to be noted that the Ijt is calculated as a positive value and is adjusted to increase the energization amount to the electric motor MTR.

The during-deceleration inertia compensation energization amount (second inertia compensation energization amount) Ikt is calculated based on the determination flag FLk that indicates the necessity determination result of inertia compensation control during the deceleration, and the during-deceleration control amount characteristic (that is a second control amount characteristic and corresponds to the second pattern) CHk. The during-deceleration control amount characteristic CHk is stored in advance in the ECU as the characteristic (calculation map) of the Ikt relative to an elapsed time T since the during-deceleration inertia compensation control is determined to be necessary. In the CHk, the Ikt decreases abruptly from "0" to a predetermined energization amount (predetermined value) ik1 along with time from the time T of "0" and thereafter increases gently from the predetermined energization amount (predetermined value) ik1 to "0" along with time. In detail, in the CHk, a time period tvp that is required for the Ikt to decrease from "0" to the predetermined energization amount ik1 is set to be shorter than a time period ten that is required for the Ikt to increase from the predetermined energization amount ik1 to "0".

As illustrated in FIG. 12 with broken lines, in a case where the energization amount decreases, it is possible to set the Ikt, which has a "concave-up" characteristic, so as to first decrease abruptly and thereafter decrease gently. On the other hand, in a case where the energization amount increases, it is possible to set the Ikt, which has a "concave-down" characteristic, so as to first increase abruptly and thereafter increase gently. Then, the time point when the necessity determination flag FLk is switched from "0" to "1" is defined as an original time point (T=0) in the CHk for measuring an elapsed, and the inertia compensation energization amount during deceleration of the electric motor (second inertia compensation energization amount) Ikt is determined based on the elapsed time T measured from the switched time point and the during-deceleration control amount characteristic CHk. Even though the flag FLk is switched from "1" to "0" in the calculation of the Ikt, the Ikt keeps being calculated over a continuation duration that is set in the calculation map CHk. It is to be noted that the Ikt is calculated as a negative value and is adjusted to decrease the energization amount to the electric motor MTR.

Figure 13:
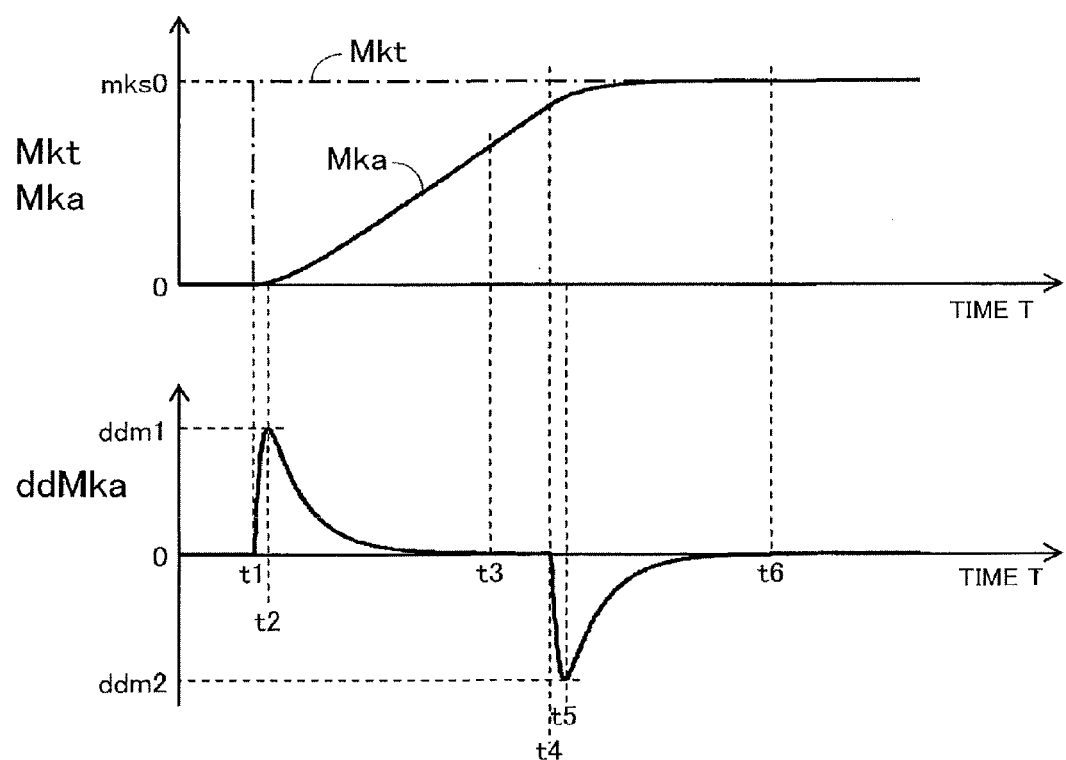
FIG. 13 is a graph showing a maximum response from the braking means (brake actuator).

Here, the calculation characteristic CHj (first pattern) in the during-acceleration inertia compensation control and the calculation characteristic CHk (second pattern) in the during-deceleration inertia compensation control are determined based on the maximum response from the braking means (brake actuator) BRK. In response to the changing of the input (target energization amount) to the BRK, the resultant output (displacement of the electric motor) occurs with a delay. The maximum response from the BRK (the maximum achievable state of the BRK in response to the input) means that a response from the MTR when providing a step input to the electric motor MTR (how the temporal change amount of the output changes in response to the temporal change amount of the input). In other words, how the actual displacement (rotation angle) Mka changes when the MTR is supplied with a predetermined target energization amount Imt as a step input (in an increasing direction from zero). As illustrated in FIG. 13, similarly to the above-mentioned FIG. 5, in a case where the electric motor MTR is supplied with the (predetermined) target energization amount as a step input (thus, the target value Mkt of the rotation angle (which is of the predetermined amount mksO) is provided as a step input), the actual value (output) Mka of the rotation angle changes to achieve the target value (input) Mkt (to follow the target value with a dely). The CHj and the CHk are determined based on the change of the Mka.

The torque that compensates for the inertia of the entire device (particularly, the inertia of the electric motor) is in proportion to the rotation angular acceleration of the electric motor. In consideration of this fact, for achieving the inertia compensation properly, the inertia compensation energization amount is calculated based on the actual acceleration (rotation angular acceleration) ddMka of the electric motor. For this reason, the acceleration (rotation angular acceleration) ddMka is calculated by finding the second-order differentiation of the actual displacement (rotation angle) Mka of the MTR and based on the resultant ddMka, the CHj and CHk are determined. For example, it is possible to set the first pattern CHj and the second pattern CHk by multiplying the ddMka with a coefficient K (constant value).

In the CHj, the increase gradient of the Ijt upon abrupt increase thereof (the gradient of the Ijt relative to time) is determined based on the maximum value or the average value of the increase gradient of the ddMka (the gradient of the ddMka that increases relative to time) between a time t1 when the step input starts and a time t2 when the rotation angular acceleration ddMka reaches its maximum value ddm1. On the other hand, the decrease gradient of the Ijt upon gentle decrease thereof (the gradient of the Ijt relative to time) is determined based on the maximum value or the average value of the decrease gradient of the ddMka (the gradient of the ddMka that decreases relative to time) between the time t2 when the ddMka reaches its maximum value ddm1 and a time t3 when the ddMka reaches almost zero.

In addition, in a case where the energization amount increases based on the ddMk at the maximum response (step response) (based on the change of ddMka between time t1 and time t2), it is possible to set the CHj so that the Ijt, which has a "concave-down" characteristic, first increases abruptly and thereafter increases gently. Similarly, in a case where the energization amount decreases based on the ddMka at the maximum response (based on the change of ddMka between time t2 and time t3), it is possible to set the CHj so that the Ijt, which has a "concave-up" characteristic, first decreases abruptly and thereafter decreases gently.

In the CHk, the decrease gradient of the Ikt upon abrupt decrease thereof (the gradient of the Ikt relative to time) is determined based on the minimum value or the average value of the decrease gradient of the ddMka (the gradient of the ddMka that decreases relative to time) between a time t4 when the ddMka begins to decrease from zero and a time t5 when the ddMka reaches its minimum value ddm2. On the other hand, the increase gradient of the Ikt upon gentle increase thereof (the gradient of the Ikt relative to time) is determined based on the maximum value or the average value of the increase gradient of the ddMka (the gradient of the ddMka that increases relative to time) between the time t5 when the ddMka reaches its minimum value ddm2 and a time t6 when the ddMka returns almost zero.

In addition, in a case where the energization amount decreases based on the ddMka at the maximum response (step response) (based on the change of ddMka between time t4 and time t5), it is possible to set the CHk so that the Ikt, which has a "concave-up" characteristic, first decreases abruptly and thereafter decreases gently. Similarly, in a case where the energization amount increases based on the ddMka at the maximum response (based on the change of ddMka between time t5 and time t6), it is possible to set the CHk so that the Ikt, which has a "concave-down" characteristic, first increases abruptly and thereafter increases gently.

In a case where the electric motor MTR is in acceleration (particularly, when the MTR is initiated), generating torque is required for overcoming the frictions of the bearings and the like, while in a case where the electric motor MTR is in deceleration (particularly, when the MTR is stopping), the frictions act the MTR to decelerate. For this reason, the absolute value of the during-acceleration predetermined energization amount (the first predetermined energization amount) ij1 is set to be larger than the absolute value of the during-deceleration predetermined energization amount (the second predetermined energization amount) ik1 (|ij1|>|ik1|).

<Configuration of Inertia Compensation Control Block of Eighth Embodiment>

Figure 14:
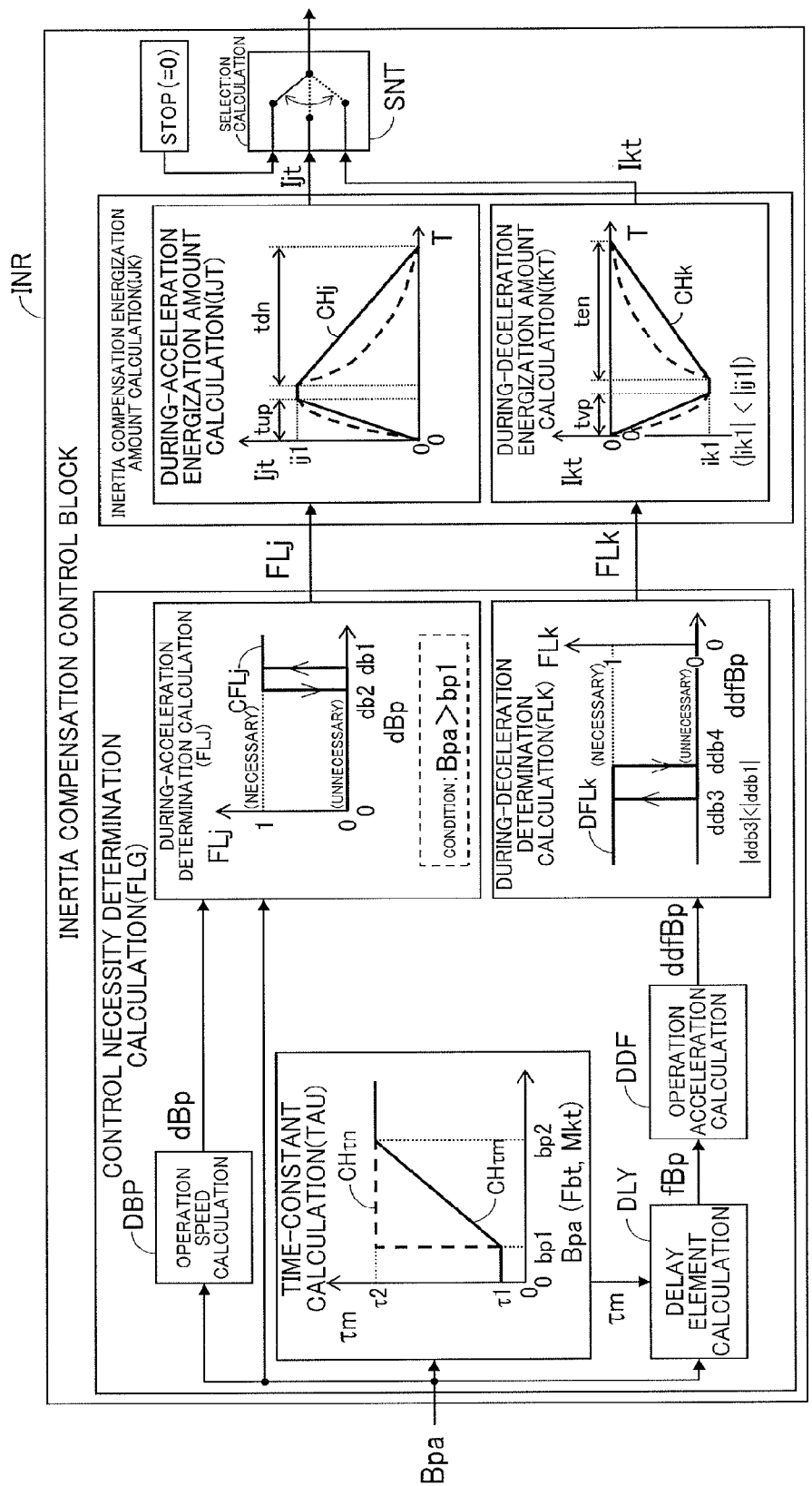
FIG. 14 is a functional block diagram illustrating the inertia compensation control block that is illustrated in FIG. 3 according to an eighth embodiment of the present invention.
Figure 15:
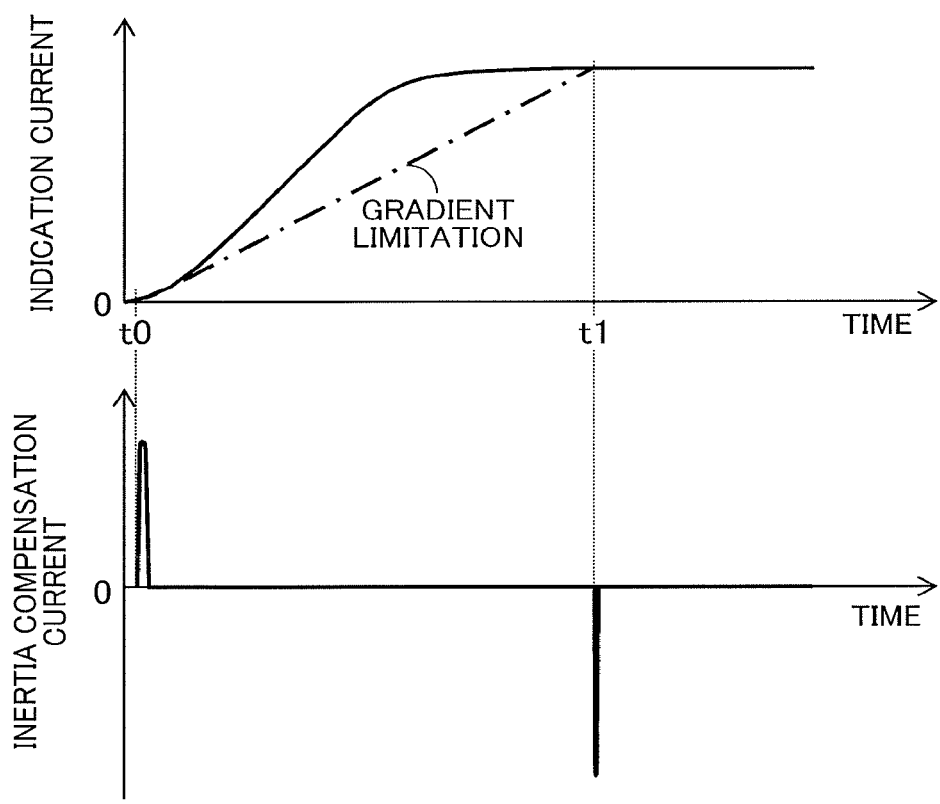
FIG. 15 is a time chart illustrating an example of a calculated result of an inertia compensation current when a related-art brake control device provides a gradient limitation against an indication current.

Next, with reference to FIG. 14, an inertia compensation control block according to an eighth embodiment of the present invention is described. In the above-mentioned INR according to the seventh embodiment (see FIG. 12), the during-acceleration determination calculation block FLJ of the control necessity determination control block FLG determines, based on the processed acceleration value (ddfBp or the like), whether or not the inertia compensation control is necessary during the acceleration. To the contrary, this INR according to the eighth embodiment determines, based on the unprocessed speed value (dBP or the like) as an alternative of the processed acceleration value (ddfBp or the like), whether or not the inertia compensation control is necessary during the acceleration. The following description of the eighth embodiment deals only with the difference from the above-mentioned seventh embodiment (see FIG. 12).

In the operation speed calculation block DBP, based on the operation amount Bpa of the braking operation member, its operation speed (unprocessed speed value) dBp is calculated. The operation speed bBp is calculated by subjecting the Bpa to first-order differentiation.

In the during-acceleration determination calculation block FLJ of the control necessity determination calculation block FLG, based on the operation speed dBp of the braking operation member BP, it is determined whether the inertia compensation control is in "necessary state (state in necessity of executing the control)" or in "unnecessary state (without necessity of executing control)." The determination result is output as the necessity determination flag (control flag) FLj. "0" and "1" of the necessity determination flag Flj correspond to "unnecessary state" and "necessary state", respectively. It is to be noted that the determination flag FLj is set to be "0" as an initiative value in a case where the braking operation is not performed.

Based on the operation speed dBp of the braking operation member, it is determined whether or not the inertia compensation control is necessary during acceleration (e. g., when the rotation speed of the electric motor increases). In detail, pursuant to the calculation map CFLj, at a time point when the dBp exceeds the predetermined operation speed (predetermined value) db1, the during-acceleration necessity determination flag Flj is switched from "0 (unnecessary state)" to "1 (necessary state)" (FLj←1). Thereafter, at a time point when the dBp is less than the predetermined operation speed (predetermined value) db2, the necessity determination flag FLj is switched from "1" to "0" (FLj←0).

For determining the necessity of the inertia compensation control, other than the operation speed dBp, the operation amount Bpa of the braking operation member is available. In such a case, at a time point when the Bpa exceeds the predetermined operation amount (predetermined value) bp1 and concurrently the dBp exceeds the predetermined operation speed (predetermined value) db1, the necessity determination flag FLj is switched from "0" to "1". The use of the condition of Bpa>dp1 as a determination criteria can compensate for the influences of the noise and other factors in the dBp, thereby enabling a reliable determination.

In the eighth embodiment, for the necessity determination in the during-acceleration determination calculation block FLJ, the dBp is used. However, it is possible to use at least one of the dBp, the dFb, and the dMk. The target pushing-force speed dFb is calculated by differentiating the target pushing force Fbt. In addition, the target speed dMk is calculated by differentiating the target position Mkt. Each of the target pushing force Fbt and the target position Mkt is a unprocessed value that is not subjected to the delay element processing in the delay element calculation block DLY.

Determining the during-acceleration control based on the processed acceleration value (ddfBp or the like) that is subjected to the delay element calculation brings in a disadvantage from the viewpoint of responsiveness. Thus, in the fourth embodiment, in the during-acceleration inertia compensation control for which the responsiveness is required, the necessity of control is determined using the state amount (unprocessed value) that is not subjected to the delay processing. On the other hand, in the during-deceleration control, determining the necessity of control based on the processed acceleration value (ddfBp or the like) makes it possible to attain an overshoot suppression with reliability.

Now, descriptions are made as to operations and effects of the inertia compensation control in the inertia compensation control block INR which are common to the above-mentioned fifth to eighth embodiments. The inertia compensation control is a control for adjusting the energization amount (Ijt, Ikt) relative to the target energization amount Imt, the energization amount (Ijt, Ikt) corresponding to the force (torque) that is necessary for the moving parts (including the MTR) of the device having the inertia to accelerate or decelerate. In detail, the energization amount is compensated for (corrected) by increasing the target energization amount during acceleration of the electric motor, while the energization amount is compensated for (corrected) by decreasing the target energization amount during deceleration of the electric motor.

In order to ensure the responsiveness of the braking torque during acceleration of the electric motor MTR (particularly, at its initiation), it is important to improve the start-up of the electric motor MTR (motion initial stage from at rest) by compensating for the influences of the inertia of the electric motor and static frictions of the bearings and the like. According to the above-mentioned fifth to eighth embodiments, the actual response (how the output changes in response to the change of the input) of the braking means is represented based on the delay element (n-th delay transfer function, where n represents an integer of "1" or more) using the "time constant (fixed value or variable calculated based on the Bpa)" instead of the "gradient limitation" discussed in BACKGROUND ART. Thus, it is possible to calculate the inertia compensation current immediately after the electric motor begins to accelerate with reliability (see FIG. 10). Thus, it is possible to compensate for the influences of the inertia of the electric motor and the like, resulting in a remarkable improvement of the responsiveness of the braking torque when the electric motor begins to rotate.

Likewise, during deceleration of the electric motor (in the case of the transfer from motion state to rest state of the electric motor), it is also important to compensate for the inertia at the initial stage of the deceleration of the electric motor. According to the above-mentioned fifth to eighth embodiments, the actual response (how the output changes in response to the change of the input) of the braking means is represented based on the delay element (n-th delay transfer function, where n represents an integer of "1" or more) using the "time constant (fixed value or variable calculated based on the Bpa)" instead of the "gradient limitation" discussed in BACKGROUND ART. Thus, it is possible to calculate the inertia compensation current immediately after the electric motor begins to decelerate with reliability (see FIG. 10). Thus, it is possible to increase the deceleration of the electric motor immediately after the electric motor begins to decelerate, resulting in a remarkable suppression of the overshoot of the braking torque. In summary, with the preceding configuration, it is possible to compensate for the influences of the inertia of the entire device which includes the inertia of the electric motor with efficiency and with reliability.

What is claimed is:

1. A vehicle brake control device, comprising:
   operation amount acquisition means for acquiring an operation amount of a driver-operated braking operation member of a vehicle;
   braking means for causing an electric motor to generate a braking torque to a wheel of the vehicle; and
   control means for calculating a target energization amount based on the operation amount and controlling the electric motor based on the target energization amount,
   wherein the control means is configured to:
      determine, based on the operation amount, whether or not an inertia compensation control for compensating for an influence of an inertia of the braking means is necessary;
      calculate, in a case where the inertia compensation control is determined to be necessary, an inertia compensation energization amount for compensating for the influence of the inertia of the braking means based on a time-series pattern that is set in advance based on a maximum response from the braking means; and
      calculate the target energization amount based on the inertia compensation energization amount.

2. A vehicle brake control device according to claim 1, wherein the control means is configured to:
   determine, based on the operation amount, whether or not the inertia compensation control is necessary during acceleration of the electric motor in which a rotation speed thereof increases; and
   use, in a case where the inertia compensation control during the acceleration is determined to be necessary, as the time-series pattern, a first pattern in which the inertia compensation energization amount increases from zero at an increase gradient and thereafter decreases to zero at a decrease gradient,
   the increase gradient being set in advance based on an actual position change of the electric motor that occurs when a step input of the target energization amount is performed to the electric motor,
   the decrease gradient being set in advance to be gentler than the increase gradient.

3. A vehicle brake control device according to claim 1, wherein the control means is configured to:
   determine, based on the operation amount, whether or not the inertia compensation control is necessary during deceleration of the electric motor in which a rotation speed thereof decreases; and
   use, in a case where the inertia compensation control during the deceleration is determined to be necessary, as the time-series pattern, a second pattern in which the inertia compensation energization amount decreases from zero at a decrease gradient and thereafter increases to zero at an increase gradient,
   the decrease gradient being set in advance based on an actual position change of the electric motor that occurs when a step input of the target energization amount is performed to the electric motor,
   the increase gradient being set in advance to be gentler than the decrease gradient.

4. A vehicle brake control device according to claim 1, wherein the control means is configured to:
- determine, based on the operation amount, whether or not the inertia compensation control is necessary during acceleration of the electric motor in which a rotation speed thereof increases; and
- use, in a case where the inertia compensation control during the acceleration is determined to be necessary, as the time-series pattern, a first pattern in which the inertia compensation energization amount increases from zero at an increase gradient and thereafter decreases to zero at a decrease gradient,
  - the increase gradient being set in advance based on an actual position change of the electric motor that occurs when a step input of the target energization amount is performed to the electric motor,
  - the decrease gradient being set in advance to be gentler than the increase gradient;
- determine, based on the operation amount, whether or not the inertia compensation control is necessary during deceleration of the electric motor in which a rotation speed thereof decreases; and
- use, in a case where the inertia compensation control during the deceleration is determined to be necessary, as the time-series pattern, a second pattern in which the inertia compensation energization amount decreases from zero at a decrease gradient and thereafter increases to zero at an increase gradient,
  - the decrease gradient being set in advance based on an actual position change of the electric motor that occurs when a step input of the target energization amount is performed to the electric motor,
  - the increase gradient being set in advance to be gentler than the decrease gradient.

5. A vehicle brake control device according to claim 4, wherein the control means is configured to maintain the inertia compensation energization amount at zero in a case where the electric motor is in motion immediately before the inertia compensation control during the acceleration is determined to be necessary.

6. A vehicle brake control device according to claim 4, wherein the control means is configured to calculate the inertia compensation energization amount based on the second pattern instead of the first pattern in a case where the inertia compensation control during the deceleration is determined to be necessary in a period during which the inertia compensation energization amount is calculated based on the first pattern.

7. A vehicle brake control device according to claim 4, wherein the control means is configured to maintain the inertia compensation energization amount at zero in a case where the inertia compensation control during the deceleration is determined to be necessary in a state in which the inertia compensation control during the acceleration is not determined to be necessary.

8. A vehicle brake control device according to claim 2, wherein the control means is configured to use, as the first pattern, a pattern in which the inertia compensation energization amount increases from zero in a concave-down fashion and thereafter decreases to zero in a concave-up fashion.

9. A vehicle brake control device according to claim 3, wherein the control means is configured to use, as the second pattern, a pattern in which the inertia compensation energization amount decreases from zero in a concave-up fashion and thereafter increases to zero in a concave-down fashion.

10. A vehicle brake control device according to claim 1, wherein the control means is configured to:
- calculate, based on the operation amount, an operation state variable that corresponds to at least one of an operation acceleration or an operation speed; and
- determine, based on the operation state variable, whether or not the inertia compensation control is necessary.

* * * * *